(12) United States Patent
Kobayashi

(10) Patent No.: US 9,372,296 B2
(45) Date of Patent: Jun. 21, 2016

(54) OPTICALLY ANISOTROPIC FILM

(71) Applicant: Sumitomo Chemical Company, Limited, Tokyo (JP)

(72) Inventor: Tadahiro Kobayashi, Osaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/602,687

(22) Filed: Jan. 22, 2015

(65) Prior Publication Data

US 2015/0205028 A1     Jul. 23, 2015

(30) Foreign Application Priority Data

Jan. 23, 2014  (JP) ................................ 2014-010102

(51) Int. Cl.
```
G02B 5/30       (2006.01)
G02F 1/1335     (2006.01)
G02F 1/13363    (2006.01)
G02F 1/1343     (2006.01)
```
(52) U.S. Cl.
CPC .............. *G02B 5/3083* (2013.01); *G02B 5/305* (2013.01); *G02F 1/133528* (2013.01); *G02F 1/133634* (2013.01); *G02F 1/134363* (2013.01)

(58) Field of Classification Search
CPC  G02B 5/3083; G02B 5/305; G02F 1/133634; G02F 1/133528; G02F 1/134363
USPC .......... 359/489.02, 489.07; 349/96, 103, 117, 349/118
See application file for complete search history.

(56) References Cited

U.S. PATENT DOCUMENTS

| | | | |
|---|---|---|---|
| 5,559,618 A * | 9/1996 | Mori | G02B 5/3083 349/117 |
| 5,780,629 A | 7/1998 | Etzbach et al. | |
| 6,217,792 B1 | 4/2001 | Parri et al. | |
| 6,723,395 B2 | 4/2004 | May et al. | |
| 7,136,225 B2 | 11/2006 | Matsumoto et al. | |
| 8,383,212 B2 | 2/2013 | Obata et al. | |
| 2010/0157195 A1 * | 6/2010 | Miyatake | G02B 5/3033 349/62 |
| 2011/0064892 A1 * | 3/2011 | Nokel | C07C 39/15 428/1.1 |

(Continued)

FOREIGN PATENT DOCUMENTS

| | | |
|---|---|---|
| JP | H06-34976 A | 2/1994 |
| JP | H07-261023 A | 10/1995 |

(Continued)

OTHER PUBLICATIONS

Liquid Crystal Handbook, Chapter 3, Section 4-3, "Chiral agents for TN and STN," ed: Japan Society for the Promotion of Science, 142 committee, pp. 199-202, 210, 213 (1989).

(Continued)

*Primary Examiner* — Frank Font
(74) *Attorney, Agent, or Firm* — Panitch Schwarze Belisario & Nadel LLP

(57) ABSTRACT

An optically anisotropic film which is superior in light leakage suppression in black display is provided. An optically anisotropic film is provided, which has a refractive index relation of nx>nz>ny, wherein nx−nz is less than 0.005, and nz−ny is less than 0.004, wherein nz represents a refractive index in the thickness direction, nx represents an in-plane refractive index in a direction in which a maximum refractive index is generated in the plane of the film, and ny represents a refractive index in a direction perpendicular to the diction of nx direction in the plane of the film.

15 Claims, 3 Drawing Sheets

(56) References Cited

U.S. PATENT DOCUMENTS

| | | |
|---|---|---|
| 2012/0008224 A1 | 1/2012 | Uchida |
| 2013/0171371 A1* | 7/2013 | Toyama ................ C09D 7/001 427/535 |
| 2013/0342793 A1* | 12/2013 | Takeda .............. G02F 1/133634 349/96 |

FOREIGN PATENT DOCUMENTS

| | | |
|---|---|---|
| JP | H09-506088 A | 6/1997 |
| JP | 2000-515496 A | 11/2000 |
| JP | 2003-137887 A | 5/2003 |
| JP | 3708062 B2 | 10/2005 |
| JP | 2006-342332 A | 12/2006 |
| JP | 2007-003765 A | 1/2007 |
| JP | 2007-016207 A | 1/2007 |
| JP | 2007-148098 A | 6/2007 |
| JP | 2007-169178 A | 7/2007 |
| JP | 2007-176870 A | 7/2007 |
| JP | 2007-269639 A | 10/2007 |
| JP | 2007-269640 A | 10/2007 |
| JP | 2010-031223 A | 2/2010 |
| JP | 4432487 B2 | 3/2010 |
| JP | 2010-270108 A | 12/2010 |
| JP | 2011-006360 A | 1/2011 |
| JP | 2011-207765 A | 10/2011 |
| JP | 2011-242743 A | 12/2011 |
| JP | 2012-033249 A | 2/2012 |

OTHER PUBLICATIONS

Liquid Crystal Handbook, Chapter 3, Section 8-6, "Network (completely cross-linked type)" and Chapter 6, Section 5-1 "Liquid crystal materials," ed: editorial committe of Liquid Crystal Handbook, Maruzen Co., Ltd. (Oct. 30, 2000).

* cited by examiner

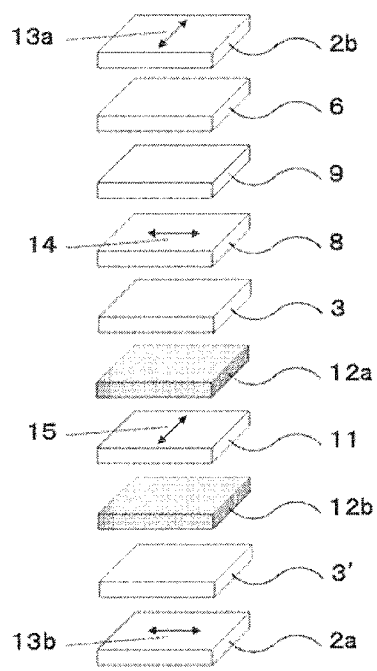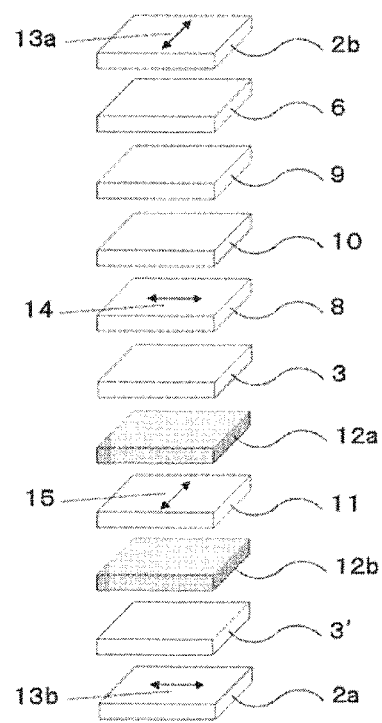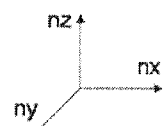

OPTICALLY ANISOTROPIC FILM

FIELD OF THE INVENTION

The present application claims the Paris Convention priority based on Japanese Patent Application No. 2014-010102 filed on Jan. 23, 2014, the entire content of which is incorporated herein by reference.

The present invention relates to an optically anisotropic film.

BACKGROUND OF THE INVENTION

A component comprising an optically anisotropic film, such as a polarization plate, a retardation film or the like, is used in a flat panel display device (FPD). As the optically anisotropic film, an optically anisotropic film is known which is produced by applying a composition comprising a polymerizable liquid crystal compound to a substrate. For example, Patent Document 1 (JP 2007-148098 A) describes an optically anisotropic film produced by applying a composition comprising a polymerizable liquid crystal compound to a substrate exposed to orientation treatment and polymerizing the liquid crystal compound in the applied layer.

Patent Document 1: JP 2007-148098 A

SUMMARY OF THE INVENTION

However, the conventional optically anisotropic film is not sufficient in an optical compensation property for suppressing light leakage in black display.

The present invention includes the following embodiments.

[1] An optically anisotropic film which has a refractive index relation of nx>nz>ny, wherein nx−nz is less than 0.005 and nz−ny is less than 0.004, wherein nz represents a refractive index in the thickness direction, nx represents an in-plane refractive index in a direction in which a maximum refractive index is generated in the plane of the film, and ny represents a refractive index in a direction perpendicular to the direction of nx direction in the plane of the film.

[2] The optically anisotropic film according to [1], wherein $R_0(450)/R_3(550)$ is from 0.8 to 1.2, wherein $R_0(550)$ represents the value of a front retardation to a light having a wavelength of 550 nm, and $R_0(450)$ represents the value of a front retardation to a light having a wavelength of 450 nm.

[3] The optically anisotropic film according to [1] or [2], wherein $R_0(550)$ is from 90 to 160 nm, $R_{40}(550)$ is from 91 to 170 nm, and $R_{50}(550)-R_0(550)$ is 10 nm or less, wherein $R_0(550)$ is as defined above, $R_{40}(550)$ represents the value of a retardation to a light having a wavelength of 550 nm entered from a direction tilted at 40 degrees from the thickness direction when the direction of ny direction is taken as a tilting axis.

[4] The optically anisotropic film according to any one of [1] to [3], wherein the film is a laminate comprising an optically anisotropic layer having an optical axis in the thickness direction and a substrate.

[5] The optically anisotropic film according to [4], wherein the substrate has an optical axis in an in-plane direction.

[6] The optically anisotropic film according to [4] or [5], wherein the difference between ny and nz of the substrate is from 0 to 0.01, wherein ny and nz are as defined above.

[7] The optically anisotropic film according to any one of [4] to [6], wherein the film has a polymer resin layer having a thickness of 1 to 300 nm between the substrate and the optically anisotropic layer.

[8] The optically anisotropic film according to [7], wherein $R_0(550)$ of the polymer resin layer is from 0 to 10 nm, wherein $R_0(550)$ is as defined above.

[9] A polarization plate comprising the optically anisotropic film according to any one of [1] to [8] and a polarization element.

[10] A polarization plate comprising the optically anisotropic film according to any one of [4] to [8] and a polarization element, wherein the optically anisotropic layer of the optically anisotropic film and the polarization element are laminated via an adhesive agent layer.

[11] The polarization plate according to [10], wherein the nx direction of the substrate for the optically anisotropic film according to any one of [4] to [8] is perpendicular to the transmission axis direction of the polarization element, wherein nx is as defined above.

[12] A display device comprising the optically anisotropic film according to any one of [1] to [8].

[13] A display device comprising the polarization plate according to any one of [9] to [11].

According to the present invention, it is possible to provide an optically anisotropic film which is superior in light leakage suppression in black display.

BRIEF DESCRIPTION OF THE DRAWINGS

FIG. 6A to FIG. 6C are diagrams showing an example of a display device comprising a polarization plate according to the present invention.

DETAILED DESCRIPTION OF EMBODIMENTS

Figure 1A:
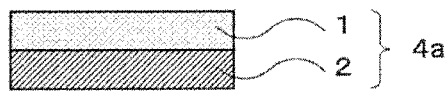
FIG. 1A and FIG. 1B are diagrams showing an example of a polarization plate according to the present invention.

The optically anisotropic film of the present invention (hereinafter, also referred to as "present optically anisotropic film") has a refractive index relation of nx>nz>ny, wherein nx−nz is less than 0.005 and nz−ny is less than 0.004. nx−nz is preferably less than 0.002, and nz−ny is preferably less than 0.003. Since the relation of nx>nz>ny is satisfied, nx−nz and nz−ny are 0 or more, respectively.

In the formulae, nz represents a refractive index in the thickness direction. nx represents a refractive index in a direction in which a maximum refractive index is generated in the plane of the film. ny represents a refractive index in a direction perpendicular to the direction of nx direction in the plane of the film.

That is, in a refractive index ellipsoid formed by an optically anisotropic film, nz represents a refractive index in a direction perpendicular to a surface of the optically anisotropic film. In a refractive index ellipsoid formed by an optically anisotropic film, nx represents a principal refractive index parallel to a surface of the optically anisotropic film. In a refractive index ellipsoid formed by an optically anisotropic film, ny represents a refractive index which is parallel to a surface of the optically anisotropic film and is perpendicular to nx direction.

In the present optically anisotropic film, ratio of front retardation value $R_0(450)$ at a light having a wavelength of 450 nm to front retardation value $R_0(550)$ at a light having a wavelength of 550 nm, $R_0(450)/R_0(550)$, is preferably from 0.8 to 1.2, and more preferably from 0.9 to 1.2. When $R_0(450)/R_0(550)$ is from 0.8 to 1.2, optical properties of the optically anisotropic film is similar to that of a liquid crystal molecule contained in a liquid crystal cell, and thus an optical compensation property is further superior.

$R_0(550)$ of the present optically anisotropic film is preferably from 90 to 160 nm, more preferably from 95 to 155 nm, and further preferably from 100 to 150 nm.

$R_{40}(550)$ of the present optically anisotropic film is preferably from 91 to 170 nm, more preferably from 105 to 165 nm, and further preferably from 110 to 160 nm.

$R_{40}(550)$ represents the value of a retardation to a light having a wavelength of 550 nm entered from a direction tilted at 40 degrees in the thickness direction when the direction of ny direction is taken as a tilting axis.tilting axistilting axis.

$R_0(550)$ and $R_{40}(550)$ satisfy a relation of $R_0(550) < R_{40}(550)$.

$R_{40}(550)$ can be measured by using a commercial phase difference measuring device and by detecting ny direction as an fast axis, and by tilting a surface of an optically anisotropic film relative to a tilting axis which is the fast axis. When the surface of the optically anisotropic film is tilted in the ny direction as a tilting axis, increase of refractive index which the optically anisotropic film is viewed from obliquely is added, and therefore, $R_0(550) < R_{40}(550)$ is generated.

In the present optically anisotropic film, $R_{40}(550) - R_0(550)$ is preferably 10 nm or less. Thus, an effect of light leakage suppression at viewing fields of each direction in black display can be become effectively.

Examples of the present optically anisotropic film include a layer formed by applying a liquid crystal material, a stretched film, and a combination of thereof.

The present optically anisotropic film may be also a film in which a number of layers having retardation are laminated, and may be also a film in which a layer having retardation and a layer having no retardation are laminated.

The present optically anisotropic film is preferably a laminate comprising an optically anisotropic layer having an optical axis in the thickness direction and a substrate. In addition, the present optically anisotropic film is preferably a laminate having a polymer resin layer between the optically anisotropic layer and the substrate.

In the present application, an optical axis refers to a direction in which a minimum birefringence is generated when a light is made incident.

<Optically Anisotropic Layer>

The optical axis of the optically anisotropic layer in the present invention (hereinafter, also referred to as "present optically anisotropic layer") preferably is in a direction vertical to a surface of the present optically anisotropic layer, that is, a direction parallel to a thickness direction of the present optically anisotropic layer. That is, the optical axis of the present optically anisotropic layer preferably corresponds to nz direction.

The present optically anisotropic layer generally has a refractive index relation of nz>nx>ny.

If the present optically anisotropic layer has the above refractive index relation, birefringence quantity of the optically anisotropic layer increases with the tilting a visual contact direction from a normal direction to a surface of the present optically anisotropic layer, and thus it is possible to obtain a compensation effect associated with change of the visual contact direction.

The front retardation value $R_0(550)$ of the present optically anisotropic layer is generally from 0 to 10 nm, and preferably from 0 to 5 nm.

The retardation value $R_{th}(550)$, of the present optically anisotropic layer in a thickness direction, is generally from −10 to −300 nm and preferably from −20 to −200 nm.

Examples of the present optically anisotropic layer include a layer formed by applying a liquid crystal material and a stretched film. When the optically anisotropic layer is a layer formed by applying a liquid crystal material, the optical properties of the optically anisotropic layer can be adjusted by an orientation condition of the liquid crystal material. When the optically anisotropic layer is a stretched film, the optical properties of the optically anisotropic layer can be adjusted by arbitrarily selecting a resin constituting the stretched film and a stretching process of the stretched film.

Examples of the liquid crystal material include rod-shaped and disk-shaped liquid crystal compounds.

When a rod-shaped liquid crystal is oriented in a direction vertical to the layer surface, an optical axis of the optically anisotropic layer corresponds to a longitudinal direction of the liquid crystal compound.

When a disk-shaped liquid crystal is oriented, an optical axis of the optically anisotropic layer exists in a direction perpendicular to a disk surface of the liquid crystal compound.

A slow axis direction of the stretched film differs depending on a stretching process, and the slow axis and the optical axis are determined by the stretching process such as uniaxial, biaxial or oblique stretching.

In order to make a layer formed by applying a liquid crystal material show a front retardation value, the liquid crystal material should be oriented in a suitable direction. In case that the liquid crystal material is a rod-shaped liquid crystal compound, a front retardation value is shown when an optical axis of the oriented liquid crystal material is parallel to a surface of an optically anisotropic layer. In this case, the optical axis direction corresponds to the slow axis direction. In case that the liquid crystal material is a disk-shaped liquid crystal compound, a front retardation value is shown when an optical axis of the oriented liquid crystal material is parallel to a surface of an optically anisotropic layer. In this case, the optical axis direction is perpendicular to the slow axis direction.

A front retardation value of the optical anisotropic layer can be controlled by adjusting the thickness of the optical anisotropic layer.

Since a front retardation value is determined according to formula (10), $\Delta n(\lambda)$ and thickness d may be adjusted in order to obtain a desired front retardation value $R_0(\lambda)$. In order for an optical anisotropic layer formed by applying a liquid crystal material to have a refractive index relation of nz>nx>ny, the liquid crystal material may be oriented in a suitable direction. In the present invention, showing retardation in a thickness direction refers to a property that $R_{th}$ (retardation value in a thickness direction) in formula (20) is negative. $R_{th}$ can be calculated from a retardation value $(R_{40})$, which is measured with being tilted at 40 degrees to an in-plane fast axis which is a tilting axis, and an a front retardation value $(R_0)$.

That is, $R_{th}$ can be calculated by determining nx, ny and nz according to the following formulae (21) to (23) from an $R_0$, $R_{40}$, d (thickness of optically anisotropic layer) and n0 (average refractive index of optically anisotropic layer), and assigning them to formula (20).

$$R_0(\lambda) = d \times \Delta n(\lambda) \quad (10)$$

wherein $R_0(\lambda)$ represents a front retardation value to a light having a wavelength of λ nm, d represents a layer thickness, and $\Delta n(\lambda)$ represents a birefringence to a light having a wavelength of λ nm.

$$R_{th} = [(nx+ny)/2 - nz] \times d \quad (20)$$

$$R_0 = (nx-ny) \times d \quad (21)$$

$$R_{40} = (nx-ny') \times d/\cos(\phi) \quad (22)$$

$$(nx+ny+nz)/3 = n0 \quad (23)$$

wherein $\phi = \sin^{-1}[\sin(40°)/n0]$, and $ny' = ny \times nz/[ny^2 \times \sin^2(\phi) + nz^2 \times \cos^2(\phi)]^{1/2}$ Birefringence $\Delta n(\lambda)$ is determined by measuring a front retardation value and dividing it by a thickness of an optically anisotropic layer. Specific measuring method is shown in the Examples, and in this case, substantial properties of an optically anisotropic layer can be determined by measuring a layer formed on a substrate which itself has no front retardation such as a glass substrate.

When the liquid crystal material is a rod-shaped liquid crystal material, a retardation in a thickness direction is shown when an optical axis of the oriented liquid crystal material is vertical to a surface of an optically anisotropic layer. When the liquid crystal material is a disk-shaped liquid crystal material, a retardation in a thickness direction is shown when an optical axis of the oriented liquid crystal material is parallel to a surface of an optically anisotropic layer. In case of a disk-shaped liquid crystal compound, an optical axis of the oriented liquid crystal compound is parallel to a surface of an optically anisotropic layer, and thus, if $R_0$ is defined, a thickness is fixed and $R_{th}$ is unambiguously determined. In case of a rod-shaped liquid crystal material, an optical axis of the oriented liquid crystal material is vertical to a surface of an optically anisotropic layer, and thus, it is possible to adjust $R_{th}$ without changing $R_0$ by adjusting a thickness of an optically anisotropic layer.

When an optical axis of the oriented rod-shaped liquid crystal compound is vertical to a surface of an optically anisotropic layer, the obtained optically anisotropic layer has a refractive index relation of nz>nx>ny, and nz corresponds to the slow axis direction.

When an optical axis of the oriented disk-shaped liquid crystal compound is parallel to a surface of an optically anisotropic layer, the obtained optically anisotropic layer has a refractive index relation of nz>nx>ny, and ny corresponds to the slow axis direction.

When an optically anisotropic layer is a stretched film, the thickness is generally 300 μm or less, preferably from 5 μm to 100 μm, and more preferably from 10 μm to 50 μm.

When the optically anisotropic layer is a layer formed by applying the liquid crystal material, the thickness is generally 20 μm or less, preferably 5 μm or less, and more preferably from 0.5 μm to 3 μm.

The thickness of the optically anisotropic layer can be determined according to a measurement by means of an interactive film thickness meter, a laser microscope or a contact-type thickness meter.

The present optically anisotropic film can be produced, for example, according to the following steps:
(1) a step of forming a polymer resin layer on a surface of a substrate,
(2) a step of applying a composition for forming an optically anisotropic layer to a surface of the obtained polymer resin layer, the composition comprising a liquid crystal material, and
(3) a step of forming an optically anisotropic layer by drying the applied composition for forming an optically anisotropic layer.

In addition, it is possible to pick the thus obtained optically anisotropic layer from the substrate and stack it on another substrate so as to obtain the present optically anisotropic film.

Examples of the liquid crystal material include a polymer liquid crystal and a liquid crystal compound, and the liquid crystal material is preferably a liquid crystal compound and more preferably a liquid crystal compound having a polymerizable group (hereinafter, also referred to as "polymerizable liquid crystal compound"). When the liquid crystal material is a polymerizable liquid crystal compound, it is preferable that the composition for forming an optically anisotropic layer further comprises a polymerization initiator.

Examples of the polymer liquid crystal include a polymer liquid crystal described in JP 07-261023 A.

<Substrate>

The substrate is preferably a resin substrate.

The resin substrate is generally a transparent resin substrate. The transparent resin substrate refers to a substrate having translucency in which a light, in particular a visible light can be transmitted, and the translucency refers to a property in which a transmission of a light beam in a wavelength of 380 to 780 nm is 80% or higher. The resin substrate is generally in the form of film, and preferably an elongated film substrate. In the present specification, "long film substrate" collectively refers to "roll-shaped long film" and "long film wound off from a roll-shaped long film".

The substrate preferably has an optical axis in a direction parallel to a substrate surface and shows a retardation. The optical properties of the present optically anisotropic film are easily controlled by combining a substrate having a retardation and an optically anisotropic layer.

The optical axis of the substrate preferably corresponds to nx direction of the substrate. When the optical axis of the substrate is parallel to the substrate surface, an effect of light leakage suppression at viewing fields of each direction in black display is more superior.

nx of the substrate contained in the present optically anisotropic film is preferably more than ny and nz of the substrate. When nx which is parallel to the substrate surface is higher than ny which is vertical thereto and higher than nz which is vertical to the substrate surface, by making a value of in-plane birefringence higher, sufficient optical properties can be obtained with thinner substrate. In this case, the optical axis of the substrate corresponds to nx direction.

ny–nz which is a difference of between the reflective index ny and nz in the substrate is preferably from 0 to 0.01, more preferably from 0 to 0.005, and further preferably from 0 to 0.001, in order to birefringence vertical to a substrate surface lower with making birefringence in a substrate surface higher.

By using such substrate, it is easy to adjust optical properties of the substrate with an optically anisotropic layer, and it is easy to control optical properties in an optically anisotropic film.

Examples of a process obtaining a substrate which has the above refractive index include a process of stretching only in nx direction without stretching in ny direction, a melting extrusion molding, or a process forming a coating layer by applying a liquid crystal compound which orients in a direction parallel to a substrate direction.

Examples of a resin constituting the substrate include polyolefins such as polyethylene, polypropylene, norbornene-based polymers; cycloolefin-based resins; polyvinyl alcohol; polyethylene terephthalate; polymethacrylic acid esters; polyacrylic acid esters; cellulosic esters such as triacetyl cellulose, diacetyl cellulose and cellulose acetate propionate; polyethylene naphthalate; polycarbonates; polysulfones; polyethersulfones; polyetherketones; polyphenylene sulfide; and polyphenylene oxide. Preferable are cellulosic esters, cycloolefin-based resins, polycarbonates, polyethylene terephthalate and polymethacrylic acid esters.

The cellulosic ester is cellulose whose hydroxyl groups are at least partly esterified, and is available in the market. In addition, a substrate comprising a cellulosic ester is also available in the market. Examples of a commercially available substrate comprising a cellulosic ester include Fujitac® film (Fujifilm Corporation), KC8UX2M (Konica Minolta Opto Co., Ltd.), KC8UY (Konica Minolta Opto Co., Ltd.) and KC4UY (Konica Minolta Opto Co., Ltd.).

The cycloolefin-based resin is polymer of a cycloolefin such as norbornene or polycyclic norbornene-based monomer, or the copolymer thereof. The cycloolefin-based resin may also comprise a ring-opening structure, and may be also a hydrogenated cycloolefin-based resin having a ring-opening structure. In addition, the cycloolefin-based resin may also comprise a structural unit derived from a chain olefin and a vinylated aromatic compound. A polar group may be introduced into the cycloolefin-based resin.

Examples of the chain olefin include ethylene and propylene, and examples of the vinylated aromatic compound include styrene, α-methylstyrene and alkyl-substituted styrene.

When the cycloolefin-based resin is a copolymer of a cycloolefin and a chain olefin or vinylated aromatic compound, a content of a structural unit derived from the cycloolefin is generally 50 mole % or less and preferably from 15 to 50 mole %, based on the total structural units of the copolymer.

When the cycloolefin-based resin is a terpolymer of a cycloolefin, a chain olefin and a vinylated aromatic compound, a content of a structural unit derived from the chain olefin is generally from 5 to 80 mole % based on the total structural units of the copolymer, and a content ratio of a structural unit derived from the vinylated aromatic compound is generally from 5 to 80 mole % based on the total structural units of the copolymer. The terpolymer has an advantage that the used amount of the costly cycloolefin can be relatively decreased.

The cycloolefin-based resin is available in the market. Example of a commercially available cycloolefin-based resin include Topas® (Ticona GmbH in Germany), ARTON® (JSR Corporation), ZEONOR® (ZEON Corporation), ZEONEX® (ZEON Corporation) and APEL® (Mitsui Chemicals, Inc). A film is formed from such a cycloolefin-based resin by known methods such as a solution casting method and a melt extrusion method, and can be as the substrate. Examples of a commercially available substrate comprising a cycloolefin-based resin include Esushina® (SEKISUI CHEMICAL CO., LTD.), SCA40® (SEKISUI CHEMICAL CO., LTD.), ZEONOR® FILM (Optes) and ARTON FILM® (JSR Corporation).

A surface treatment may be performed on the substrate. Examples of a method of the surface treatment include a method of treating a substrate surface using corona or plasma under vacuum to atmosphere pressure; a laser treatment method of a substrate surface; an ozone treatment method of a substrate surface; a saponification treatment method of a substrate surface; a flame treatment method of a substrate surface; a method of applying a coupling agent to a substrate surface; a primer treatment method of a substrate surface; and a treatment method of carrying out a graft polymerization by exposure of radiation, corona or plasma after applying a reactive monomer or polymer to a substrate surface. Among them, the method of treating a substrate surface using corona or plasma under vacuum to atmosphere pressure is preferable.

Examples of the method of treating a substrate surface using corona or plasma under vacuum to atmosphere pressure include a method of treating a substrate surface by arranging the substrate between electrodes facing with each other and generating corona or plasma under a pressure close to atmosphere pressure; a method of flowing a gas between electrodes facing with each other, making the gas into plasma between the electrodes and applying the plasma-state gas to a substrate; and a method of treating a substrate surface by generating glow discharge plasma under a low pressure condition.

Among them, preferable is a method of treating a substrate surface by arranging the substrate between electrodes facing with each other and generating corona or plasma under a pressure close to atmosphere pressure, or a method of flowing a gas between electrodes facing with each other, making the gas into plasma between the electrodes and applying the plasma-state gas to a substrate. Such methods using corona or plasma are generally carried out by means of a commercially available surface treatment device.

The substrate may also comprise a protective film on a surface reverse to the surface on which the composition for forming an optically anisotropic layer is applied. Examples of the protective film include a film such as polyethylene, polyethylene terephthalate, polycarbonate and polyolefins, and also a film additionally comprising an adhesion layer on the film. It is preferable that the substrate has an adhesion layer on a surface reverse to the surface on which the composition for forming an optically anisotropic layer is applied, and additionally has a protective film thereon. Among them, in view of a small thermal deformation in drying, polyethylene terephthalate is preferable. When the substrate has a protective film on a surface reverse to the surface on which the composition for forming an optically anisotropic layer is applied, a shaking of the film and a slight vibration of the applied surface in conveying the substrate can be suppressed, and uniformity of a coating can be improved.

The thickness of the substrate is preferably thin in view that the substrate has such a weight to be practically handled. However, too thin substrate tends to result in a reduced strength and to be inferior in workability. The thickness of the substrate is generally from 5 μm to 300 μm, and preferably from 20 μm to 200 μm.

The length of the elongated film substrate in the longitudinal direction is generally from 10 m to 3000 m, and preferably from 100 m to 2000 m. The length of the substrate in the short direction is generally from 0.1 m to 5 m, and preferably from 0.2 m to 2 m.

<Polymer Resin Layer>

The present optically anisotropic film preferably has a polymer resin layer between the present optically anisotropic layer and the substrate. The thickness of the polymer resin layer is preferably from 1 nm to 300 nm, more preferably from 10 nm to 300 nm and further preferably from 10 nm to 200 nm.

The front retardation value $R_0(550)$ of the present optically anisotropic layer to a light having a wavelength of 550 nm is preferably from 0 to 10 nm, more preferably from 0 to 8 nm and further preferably from 0 to 6 nm, for reducing an effect to optical properties of the substrate and the optically anisotropic layer.

The polymer resin layer is preferably an orientation layer which has orientation controlling force which orients the liquid crystal material.

The orientation layer preferably has solvent resistance in which the layer is not dissolved by application of the composition for an optically anisotropic layer or the like, and has heat resistance in a heat treatment for removing solvents or for orienting a liquid crystal compound. Examples of the orientation layer include an orientation layer comprising an anisotropic polymer, a photo-orientation layer, a groove orientation layer having an unevenness pattern or multiple grooves on its surface, and the like.

Such an orientation layer makes an orientation of a liquid crystal material easy. In addition, it is possible to control different orientations such as horizontal orientation, vertical orientation, hybrid orientation, inclined orientation and the like by selecting a type of an orientation layer and a rubbing condition.

<Orientation Layer Comprising Anisotropic Polymer>

Examples of the anisotropic polymer include polyamides and gelatins having amide bonds, polyimides having imide bonds and polyamic acids which are the hydrolysate thereof, polyvinyl alcohol, alkyl-modified polyvinyl alcohols, polyacrylamide, polyoxazoles, polyethyleneimine, polystyrene, polyvinylpyrrolidone, polyacrylic acid, and polyacrylic acid esters. Among them, polyvinyl alcohol is preferable. It is also possible to combine two or more kinds of the anisotropic polymers.

The orientation layer comprising an anisotropic polymer is generally obtained by applying an anisotropic polymer composition, in which an anisotropic polymer is dissolved in a solvent, to a substrate, and removing the solvent to form a coating layer, or by applying the anisotropic polymer composition to a substrate, removing the solvent to form a coating layer and rubbing the coating layer.

Examples of the solvent include water; alcohol solvents such as methanol, ethanol, ethylene glycol, isopropyl alcohol, propylene glycol, methyl cellosolve, butyl cellosolve and propylene glycol monomethyl ether; ester solvents such as ethyl acetate, butyl acetate, ethylene glycol methyl ether acetate, γ-butyrolactone, propylene glycol methyl ether acetate and ethyl lactate; ketone solvents such as acetone, methyl ethyl ketone, cyclopentanone, cyclohexanone, methyl amyl ketone and methyl isobutyl ketone; aliphatic hydrocarbon solvents such as pentane, hexane and heptane; aromatic hydrocarbon solvents such as toluene and xylene; nitrile solvents such as acetonitrile; ether solvents such as tetrahydrofuran and dimethoxyethane; and chlorinated hydrocarbon solvents such as chloroform and chlorobenzene. It is also possible to combine two or more kinds of the solvents.

The concentration of the anisotropic polymer in the anisotropic polymer composition should be in such a range that the anisotropic polymer completely dissolves in a solvent. The content of the anisotropic polymer is preferably from 0.1 to 20% by mass and more preferably from 0.1 to 10% by mass, relative to the anisotropic polymer composition.

The anisotropic polymer composition is available in the market. Examples of a commercially available product of the anisotropic polymer composition include SUNEVER® (manufactured by NISSAN CHEMICAL INDUSTRIES, LTD.) and OPTMER® (manufactured by JSR Corporation).

Examples of a method for applying the anisotropic polymer composition to a substrate include known methods such as application methods including spin coating method, extrusion method, gravure coating method, die coating method, slit coating method, bar coating method and applicator method, and also printing methods including flexo printing method. When the optically anisotropic layer is produced by a Roll-to-Roll type continuous production method, gravure coating method, die coating method or a printing method such as flexo printing method is generally employed as the application method.

Examples of a method for removing the solvent contained in the anisotropic polymer composition include air drying, draught drying, heat drying, vacuum drying and the combination method thereof. The drying temperature is preferably from 10 to 250° C., and more preferably from 25 to 200° C. The drying time is, depending on a solvent type, preferably from 5 seconds to 60 minutes, and more preferably from 10 seconds to 30 minutes.

The coating layer formed of the anisotropic polymer composition may be exposed to a rubbing treatment. By the rubbing treatment, an orientation controlling force can be provided to the coating layer.

Examples of a rubbing treatment method include a method in which the coating layer is brought into contact with a rolling rubbing roll wrapped with a rubbing cloth.

In the rubbing treatment, it is also possible to form an orientation layer comprising multiple areas (patterns) with different orientation directions by a masking treatment.

<Photo-Orientation Layer>

The photo-orientation layer can be generally obtained by applying a composition for forming a photo-orientation layer to a substrate, and radiating a polarization light, preferably polarized UV, where the composition comprises a polymer or a monomer having a photoreactive group and a solvent. It is possible to arbitrarily control the direction of the orientation controlling force of the photo-orientation layer by selecting a polarization direction of the radiated polarization light.

The photoreactive group refers to a group which generates an orientating force by light radiation. Specific examples thereof include a group involved in a photoreaction as a source of the orientating force such as orientation-induced reaction, isomerization reaction, photodimerization reaction, photocrosslinking reaction or photodegradation reaction. The photoreactive group is preferably a group having a saturated group, in particular a double bond, and particularly preferably a group having at least one selected from the group consisting of a carbon-carbon double bond (C═C bond), a carbon-nitrogen double bond (C═N bond), a nitrogen-nitrogen double bond (N═N bond) and a carbon-oxygen double bond (C═O bond).

Examples of the photoreactive group having a C═O bond include a vinyl group, a polyene group, a stilbene group, a stilbazole group, a stilbazolium group, a chalcone group and a cinnamoyl group. Examples of the photoreactive group having a C═N group include a group having a structure of a Schiff base, an aromatic hydrazone or the like. Examples of the photoreactive group having a N═N bond include an azobenzene group, an azonaphthalene group, an aromatic heterocyclic azo group, an azobis group, formazan group and a group having an azoxybenzene structure. Examples of the photoreactive group having a C═O bond include a benzophenone group, a coumalin group, an anthraquinone group and a maleimide group. These groups may also have a substituent group such as an alkyl group, an alkoxy group, an aryl group, an allyloxy group, a cyano group, an alkoxycarbonyl group, a hydroxyl group, a sulfonate group or a halogenated alkyl group.

As the photoreactive group, a group involved in photodimerization reaction or photocrosslinking reaction is preferable in view of its superior orientation. Among them, a group involved in photodimerization reaction is preferable, and in view that a radiating amount of a polarization light required for orientation is relatively low and that a photo-orientation layer having thermal and temporal stabilities is easily obtained, a cinnamoyl group and a chalcone group are preferable. The polymer having a photoreative group particularly preferably has a cinnamoyl group such that a terminal part of a side chain of the polymer has a cinnamic acid structure.

By applying the composition for forming a photo-orientation layer on a substrate, it is possible to form an optical orientation-induced layer on the substrate. Examples of a solvent contained in the composition include the same solvents as those contained in the above anisotropic polymer composition, and the solvent can be selected depending on a solubility of the polymer or monomer having a photoreactive group.

The amount of the polymer or monomer having a photoreactive group in the composition for forming a photo-orientation layer can be adjusted depending on the type of the polymer or monomer and the targeted thickness of the photo-orientation layer. The amount is preferably at least 0.2% by mass, and more preferably in a range of 0.3 to 10% by mass. Unless the properties of the photo-orientation layer are remarkably impaired, the composition for forming a photo-orientation layer may also comprise a polymer material such as polyvinyl alcohol or a polyimide and a photosensitizer.

Examples of a method for applying the composition for forming a photo-orientation layer to a substrate include the same methods as the methods for applying the anisotropic polymer composition to a substrate. Examples of a method for removing a solvent from the applied composition for forming a photo-orientation layer include the same methods as the methods for removing a solvent from the anisotropic polymer composition.

In radiating a polarization light, it is possible either to radiate the polarization light directly to the composition for forming a photo-orientation layer, which is applied on a substrate, after a solvent is removed, or to radiate a polarization light through a substrate by radiating the polarization light from a side of the substrate. The polarization light is preferably a substantially parallel light. The wavelength of the radiated light is preferably in such a wavelength range that the polymer or monomer having a photoreactive group may incorporate optical energy. Specially, UV (ultraviolet light) in a wavelength range of 250 to 400 nm is particularly preferable. Examples of a light source for radiating the polarization light include a xenon lamp, a high-pressure mercury lamp, an extra high-pressure mercury lamp, a metal halide lamp, ultraviolet laser such as KrF and ArF, and the like. Among them, a high-pressure mercury lamp, an extra high-pressure mercury lamp and a metal halide lamp are preferable, since an emission intensity of an ultraviolet light at a wavelength of 313 nm is high. A polarized UV can be radiated by radiating a light from the light source through a suitable polarization layer. Examples of the polarization layer include a polarization prism such as a polarized filter, a Glan-Thomson and a Glan-Taylor, and also a wire grid-type polarizer.

In radiating the polarization light, it is also possible to form an orientation layer having multiple areas (patterns) with different orientation directions by a masking treatment.

<Groove Orientation Layer>

A groove orientation layer is a layer having an unevenness pattern or multiple grooves on its surface. When a liquid crystal molecule is arranged on a layer having multiple liner grooves at equal intervals, the liquid crystal molecule is oriented in the direction along the grooves.

Examples of a method for obtaining the groove orientation layer include a method in which after exposure on a surface of a photoreactive polyimide layer through an exposure mask having a slit in a pattern form, development and rinsing treatments are carried out to form an evenness pattern; a method in which a UV-curable resin layer before cured is formed on a plate-shaped base board having grooves on its surface, and the resin layer is transmitted onto a substrate and then cured; a method in which a layer of a UV-curable resin before cured, which is formed on a substrate, is pressed onto a roll-shaped base board having multiple grooves to form unevenness and then cured; and the like. Specific examples of the methods include the methods described in JP 06-34976 A, JP 2011-242743 A and the like.

Among the above-mentioned methods, preferable is a method in which a layer of a UV-curable resin before cured, which is formed on a substrate, is pressed onto a roll-shaped base board having multiple grooves to form unevenness and then cured. The roll-shaped base board preferably a stainless (SUS) steel, in view of durability.

Examples of the UV-curable resin include a monofunctional acrylate, a polyfunctional acrylate and the mixture thereof.

The monofunctional acrylate is a compound having one group selected from the group consisting of an acryloyloxy group ($CH_2=CH-COO-$) and a methacryloyloxy group ($CH_2=C(CH_3)-COO-$) (hereinafter, also referred to as "(meth)acryloyloxy group"). "(Meth)acrylate" means acrylate or methacrylate.

Examples of the monofunctional acrylate having one (meth)acryloyloxy group include an alkyl (meth)acrylate having 4 to 16 carbon atoms, a β-carboxyalkyl (meth)acrylate having 2 to 14 carbon atoms, an alkylated phenyl (meth)acrylate having 2 to 14 carbon atoms, methoxypolyethylene glycol (meth)acrylate, phenoxypolyethylene glycol (meth)acrylate and isobonyl (meth)acrylate.

The polyfunctional acrylate is a compound having two or more of (meth)acryloyloxy groups, and preferably a compound having 2 to 6 of (meth)acryloyloxy groups.

Examples of the polyfunctional acrylate having two (meth)acryloyloxy groups include 1,3-butanediol di(meth)acrylate; 1,6-hexanediol di(meth)acrylate; ethylene glycol di(meth)acrylate; diethylene glycol di(meth)acrylate; neopentyl glycol di(meth)acrylate; triethylene glycol di(meth)acrylate; tetraethylene glycol di(meth)acrylate; polyethylene glycol diacrylate; bis(acryloyloxyethyl)ether of bisphenol A; ethoxylated bisphenol A di(meth)acrylate; propoxylated neopentyl glycol di(meth)acrylate; ethoxylated neopentyl glycol di(meth)acrylate, 3-methylpentanediol di(meth)acrylate.

Examples of the polyfunctional acrylate having 3 to 6 of (meth)acryloyloxy groups include trimethylolpropane tri(meth)acrylate; pentaerythritol tri(meth)acrylate; tris(2-hydroxyethyl)isocyanurate tri(meth)acrylate; ethoxylated trimethylolpropane tri(meth)acrylate; propoxylated trimethylolpropane tri(meth)acrylate; pentaerythritol tetra(meth)acrylate; dipentaerythritol penta(meth)acrylate; dipentaerythritol hexa(meth)acrylate; tripentaerythritol tetra(meth)acrylate; tripentaerythritol penta(meth)acrylate; tripentaerythritol hexa(meth)acrylate; tripentaerythritol hepta(meth)acrylate; tripentaerythritol octa(meth)acrylate; a reaction product of pentaerythritol tri(meth)acrylate with an acid anhydride; a reaction product of dipentaerythritol penta (meth)acrylate with an acid anhydride; a reaction product of tripentaerythritol hepta(meth)acrylate with an acid anhydride; caprolactone-modified trimethylolpropane tri(meth)acrylate; caprolactone-modified pentaerythritol tri(meth)acrylate; caprolactone-modified tris(2-hydroxyethyl) isocyanurate tri(meth)acrylate; caprolactone-modified pentaerythritol tetra(meth)acrylate; caprolactone-modified dipentaerythritol penta(meth)acrylate; caprolactone-modified dipentaerythritol hexa(meth)acrylate; caprolactone-modified tripentaerythritol tetra(meth)acrylate; caprolactone-modified tripentaerythritol penta(meth)acrylate; caprolactone-modified tripentaerythritol hexa(meth)acrylate; caprolactone-modified tripentaerythritol hepta(meth)acrylate; caprolactone-modified tripentaerythritol octa(meth)acrylate; a reaction product of caprolactone-modified pentaerythritol tri(meth)acrylate with an acid anhydride; a reaction product of caprolactone-modified dipentaerythritol penta(meth)acrylate with an acid anhydride; and a reaction product of caprolactone-modified tripentaerythritol hepta (meth)acrylate with an acid anhydride.

The "caprolactone-modified" means that a ring-opened body or a ring-opened polymer of caprolactone is introduced between an alcohol-derived moiety and a (meth)acryloyloxy group of a (meth)acrylate compound.

The polyfunctional acrylate is available in the market. Examples of the commercially available thereof include A-DOD-N, A-HD-N, A-NOD-N, APG-100, APG-200, APG-400, A-GLY-9E, A-GLY-20E, A-TMN-3, A-TMPT, AD-TMP, ATM-35E, A-TMMT, A-9550, A-DPH, HD-N, NOD-N, NPG and TMPT (manufactured by Shin-Nakamura Chemical Co., Ltd.); ARONIX M-220, M-325, M-240, M-270, M-309, M-310, M-321, M-350, M-360, M-305, M-306, M-450, M-451, M-408, M-400, M-402, M-403, M-404, M-405 and M-406 (manufactured by Toagosei Co., Ltd.); EBECRYL 11, 145, 150, 40, 140 and 180, DPGDA, HDDA, TPGDA, HPNDA, PETIA, PETRA, TMPTA, TMP-EOTA, DPHA and EBECRYL series (manufactured by Daicel-cytec).

In order to obtain an orientation with little orientation disturbance, the width of the protrusion of the groove orientation layer is preferably from 0.05 to 5 μm, the width of the recess is preferably from 0.1 to 5 μm, and the gap depth of the evenness is preferably 2 μm or less and more preferably from 0.01 to 1 μm.

<Composition for Forming Optically Anisotropic Layer>

The composition for forming an optically anisotropic layer comprises a liquid crystal material. In addition, the composition for forming an optically anisotropic layer may also comprise a solvent, a leveling agent, a chiral agent, a polymerization initiator, a polymerization inhibitor, a photosensitizer and a reactive additive.

When the liquid crystal material is a polymer liquid crystal, the composition for forming an optically anisotropic layer preferably comprises a solvent and a leveling agent.

When the liquid crystal material is a liquid crystal compound, the composition for forming an optically anisotropic layer preferably comprises a solvent, a leveling agent, a chiral agent and the like. When the liquid crystal compound is a polymerizable liquid crystal compound, the composition for forming an optically anisotropic layer preferably also comprises a polymerization initiator, and furthermore, comprises a polymerization inhibitor, a photosensitizer and a reactive additive.

<Liquid Crystal Compound>

Examples of the liquid crystal compound include a compound having a group represented by formula (X) (hereinafter, also referred to as "compound (X)"):

$$P^{11}\text{-}B^{11}\text{-}E^{11}\text{-}B^{12}\text{-}A^{11}\text{-}B^{13}\text{-} \quad (X)$$

wherein $P^{11}$ represents a hydrogen atom or a polymerizable group, $A^{11}$ represents a divalent alicyclic hydrocarbon group or a divalent aromatic hydrocarbon group, where a hydrogen atom of the divalent alicyclic hydrocarbon group and of the divalent aromatic hydrocarbon group may be substituted with a halogen atom, an alkyl group having 1 to 6 carbon atoms, an alkoxy group having 1 to 6 carbon atoms, a cyano group or a nitro group, and where a hydrogen atom of the alkyl group having 1 to 6 carbon atoms and of the alkoxy group having 1 to 6 carbon atoms may be substituted with a fluorine atom, $B^{11}$ represents —O—, —S—, —CO—O—, —O—CO—, —O—CO—O—, —CO—NR$^{16}$—, —NR$^{16}$—CO—, —CO—, —CO—, —CS— or a single bond, where $R^{16}$ represents a hydrogen atom or an alkyl group having 1 to 6 carbon atoms, $B^{12}$ and $B^{13}$ each independently represent —C≡C—, —CH=CH—, —CH$_2$—CH$_2$—, —O—, —S—, —C(=O)—, —C(=O)—O—, —O—C(=O)—, —O—C (=O)—O—, —CH=N—, —N=CH—, —N=N—, —C(=O)—NR$^{16}$—, —NR$^{16}$—C(=O)—, —OCH$_2$—, —OCF$_2$—, —CH$_2$O—, —CF$_2$O—, —CH=CH—C (=O)—O—, —O—C(=O)—CH=CH— or a single bond, and $E^{11}$ represents an alkanediyl group having 1 to 12 carbon atoms, where a hydrogen atom contained in the alkanediyl group may be also substituted with an alkoxy group having 1 to 5 carbon atoms, a hydrogen atom of the alkoxy group may be also substituted with a halogen atom, and —CH$_2$— constituting the alkanediyl group may be also substituted with —O— or —CO—. Examples of the polymerizable liquid crystal compound include a compound having a polymerizable group stated in compound (X). It is also possible to use the liquid crystal compound alone, or to combine multiple compounds having different structures.

The carbon number of the divalent alicyclic hydrocarbon group and divalent aromatic hydrocarbon group represented by $A^{11}$ is preferably in a range of 3 to 18, more preferably in a range of 5 to 12, and particularly preferably 5 or 6. All is preferably cyclohexane-1,4-diyl group or 1,4-phenylene group.

The alkanediyl group having 1 to 12 carbon atoms represented by $E^{11}$ is preferably a liner alkanediyl group having 1 to 12 carbon atoms, where —CH$_2$— constituting the alkanediyl group having 1 to 12 carbon atoms may be also substituted with —O—.

Specific examples thereof include liner alkanediyl groups having 1 to 12 carbon atoms such as methylene group, ethylene group, propane-1,3-diyl group, butane-1,4-diyl group, pentane-1,5-diyl group, hexane-1,6-diyl group, heptane-1,7-diyl group, octane-1,8-diyl group, nonane-1,9-diyl group, decane-1,10-diyl group, undecane-1,11-diyl group and dodecane-1,12-diyl group; —CH$_2$—CH$_2$—O—CH$_2$—CH$_2$—, —CH$_2$—CH$_2$—O—CH$_2$—CH$_2$—O—CH$_2$—CH$_2$—, and —CH$_2$—CH$_2$—O—CH$_2$—CH$_2$—O—CH$_2$—CH$_2$—O—CH$_2$—CH$_2$—.

$B^{11}$ is preferably —O—, —S—, —CO—O— or —O—CO—, and among them, —CO—O— is more preferable.

$B^{12}$ and $B^{13}$ are preferably, each independently, —O—, —S—, —C(=O)—, —C(=O)—O—, —O—C(=O)— or —O—C(=O)—O—, and among them, —O— or —O—C(=O)—O— is more preferable.

In view that a photopolymerization reaction tends to take place, the polymerizable group represented by $P^{11}$ is preferably a radically polymerizable group or a cationically polymerizable group, and in view of an easy handling and an easiness to produce a polymerizable liquid crystal compound, the polymerizable group represented by $P^{11}$ is preferably a stilbene group or a group represented by the following formulae (P-11) to (P-15):

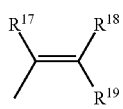
(P-11)

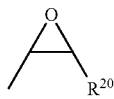
(P-12)

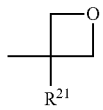
(P-13)

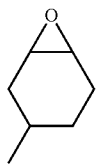
(P-14)

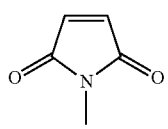
(P-15)

wherein $R^{17}$ to $R^{21}$ each independently represent an alkyl group having 1 to 6 carbon atoms or a hydrogen atom.

Specific examples of the group represented by formulae (P-11) to (P-13) include a p-stilbene group and groups represented by the following formulae (P-16) to (P-20).

(P-16)

(P-17)

(P-18)

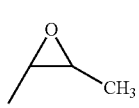
(P-19)

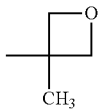
(P-20)

$P^{11}$ is preferably a group represented by formulae (P-14) to (P-20), and more preferably a vinyl group, an epoxy group or an oxetanyl group.

The group represented by $P^{11}$-$B^{11}$- is further preferably an acryloyloxy group or a methacryloyloxy group.

Examples of compound (X) include a compound represented by formulae (I), (II), (III), (IV), (V) and (VI):

$P^{11}$-$B^{11}$-$E^{11}$-$B^{12}$-$A^{11}$-$B^{13}$-$A^{12}$-$B^{14}$-$A^{13}$-$B^{15}$-$A^{14}$-$B^{16}$-$E^{12}$-$B^{17}$-$P^{12}$ (I)

$P^{11}$-$B^{11}$-$E^{11}$-$B^{12}$-$A^{11}$-$B^{13}$-$A^{12}$-$B^{14}$-$A^{13}$-$B^{15}$-$A^{14}$-$F^{11}$ (II)

$P^{11}$-$B^{11}$-$E^{11}$-$B^{12}$-$A^{11}$-$B^{13}$-$A^{12}$-$B^{14}$-$A^{13}$-$B^{15}$-$E^{12}$-$B^{17}$-$P^{12}$ (III)

$P^{11}$-$B^{11}$-$E^{11}$-$B^{12}$-$A^{11}$-$B^{13}$-$A^{12}$-$B^{14}$-$A^{13}$-$F^{11}$ (IV)

$P^{11}$-$B^{11}$-$E^{11}$-$B^{12}$-$A^{11}$-$B^{13}$-$A^{12}$-$B^{14}$-$E^{12}$-$B^{17}$-$P^{12}$ (V)

$P^{11}$-$B^{11}$-$E^{11}$-$B^{12}$-$A^{11}$-$B^{13}$-$A^{12}$-$F^{11}$ (VI)

wherein $A^{12}$ to $A^{14}$ each independently are defined in the same manner as $A^{11}$, $B^{14}$ to $B^{16}$ each independently are defined in the same manner as $B^{12}$, $B^{17}$ is defined in the same manner as $B^{11}$, and $E^{12}$ is defined in the same manner as $E^{11}$, $F^{11}$ represents a hydrogen atom, an alkyl group having 1 to 13 carbon atoms, an alkoxy group having 1 to 13 carbon atoms, a cyano group, a nitro group, a trifluoromethyl group, a dimethylamino group, a hydroxy group, a methylol group, a formyl group, a sulfo group (—$SO_3H$), a carboxy group, an alkoxycarbonyl group having 1 to 10 carbon atoms or a halogen atom, where —$CH_2$— constituting the alkyl group and alkoxy group may be also substituted with —O—, and $P^{12}$ represents a hydrogen atom or a polymerizable group, and preferably a polymerizable group, and examples thereof include the polymerizable groups described above $P^{11}$, and at least one of $P^{11}$ and $P^{12}$ is a polymerizable group.

Specific examples of the liquid crystal compound include the compounds described in "3.8.6 Network (Complete crosslink type)" and "6.5.1 Liquid crystal material b. Polymerizable nematic liquid crystal material" in "Liquid crystal handbook" (edited by editorial committee of Liquid crystal handbook, Maruzen Co., Ltd., Oct. 30, 2000), JP 2010-31223 A, JP 2010-270108 A, JP 2011-6360 A and JP 2011-207765 A.

The liquid crystal compound preferably has a polymerizable group. Examples of the polymerizable group include the above-mentioned polymerizable group represented by $P^{11}$.

Specific examples of compound (X) include compounds represented by the following formulae (I-1) to (I-4), formulae (II-1) to (II-4), formulae (III-1) to (III-26), formulae (IV-1) to (IV-26), formulae (V-I) to (V-2) and formulae (VI-1) to (VI-6). In the following formulae, k1 and k2 each independently represent an integer from 2 to 12. In view of easy synthesis and availability, preferable are compounds (X) represented by formulae (I-1) to (I-4), formulae (II-1) to (II-4), formulae (III-1) to (III-26), formulae (IV-1) to (IV-26), formulae (V-1) to (V-2) and formulae (VI-1) to (VI-6).

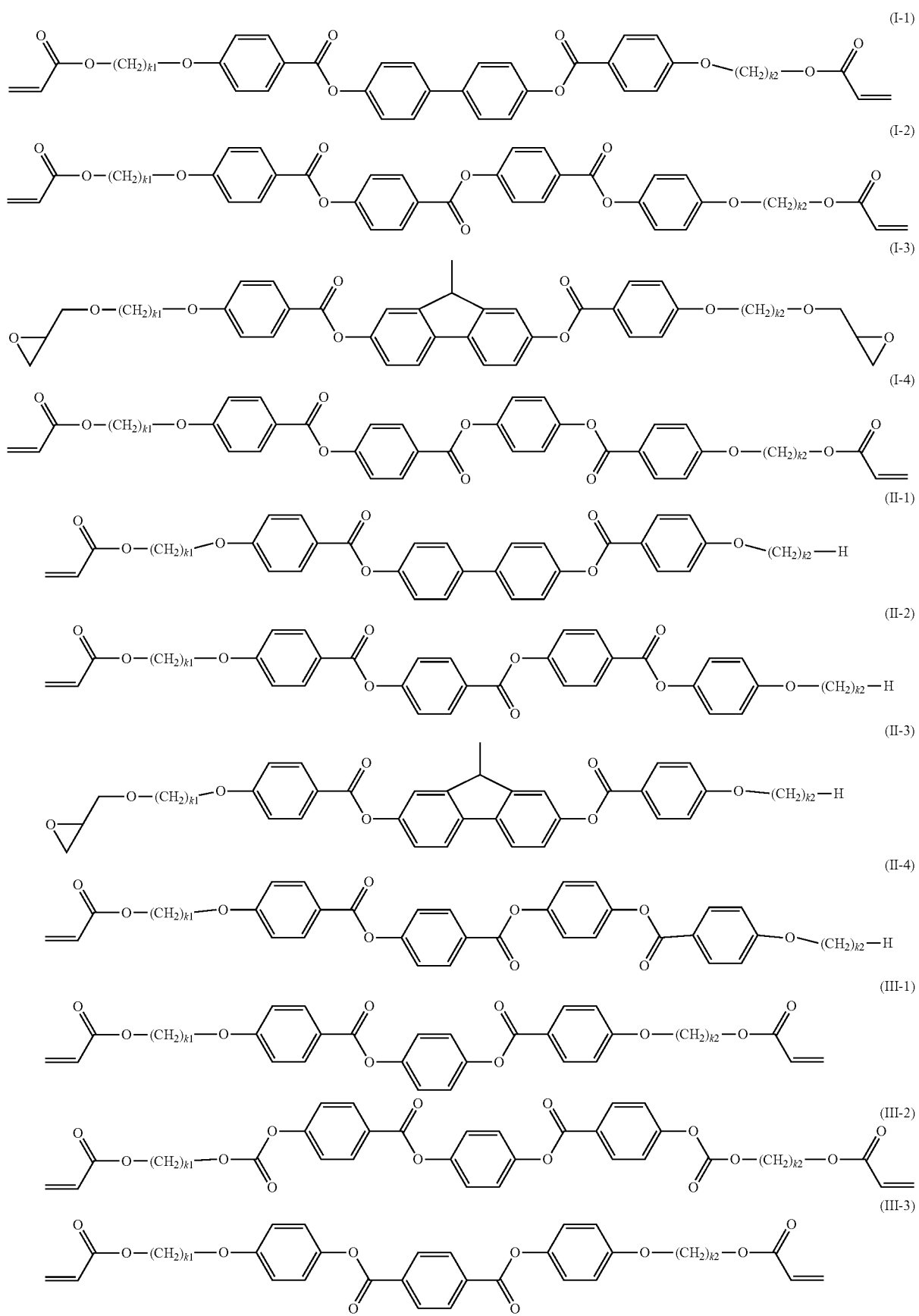

-continued
(III-4)
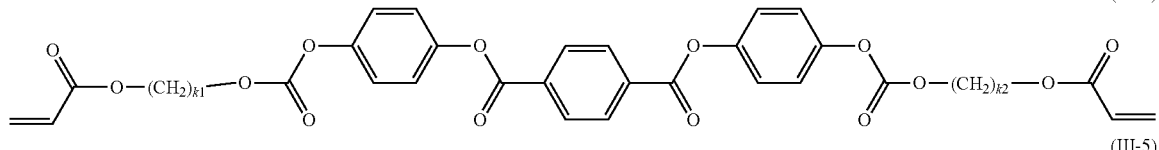
(III-5)
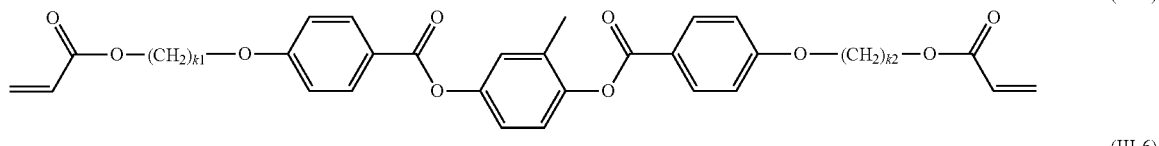
(III-6)
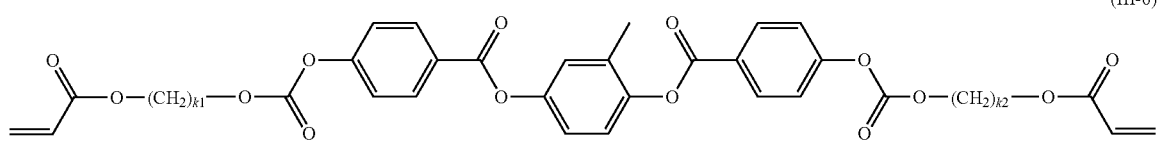
(III-7)
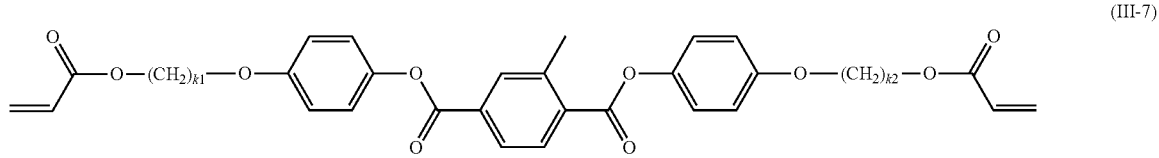
(III-8)
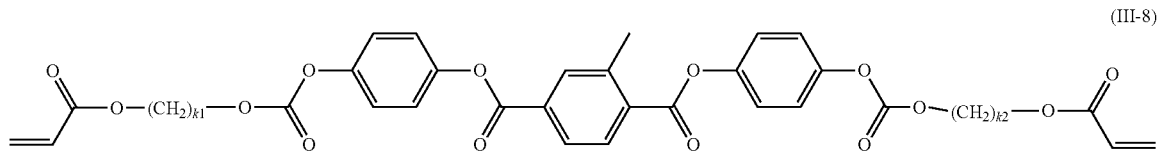
(III-9)
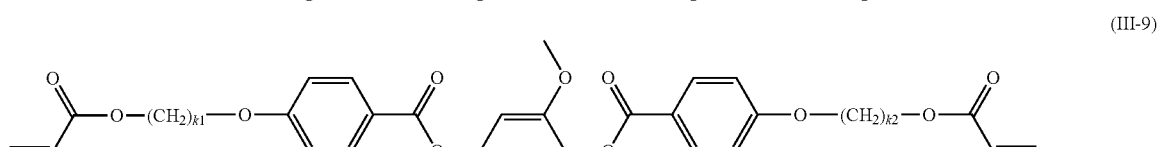
(III-10)
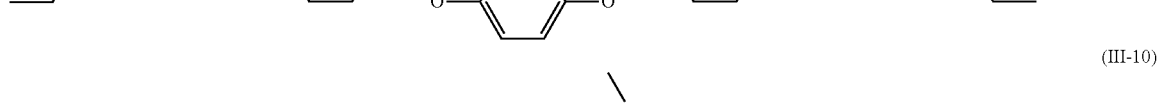
(III-11)
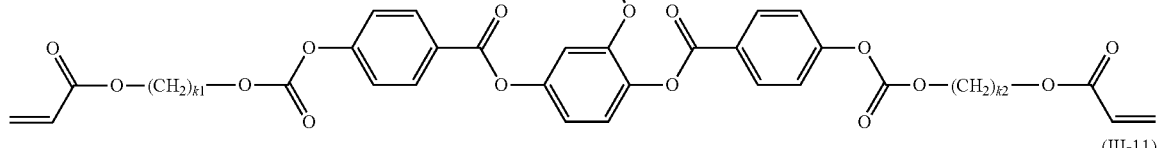
(III-12)
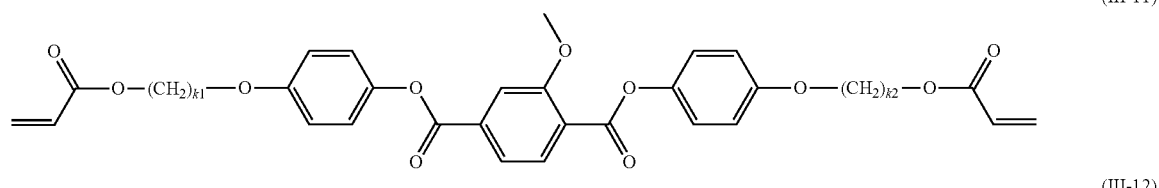
(III-13)
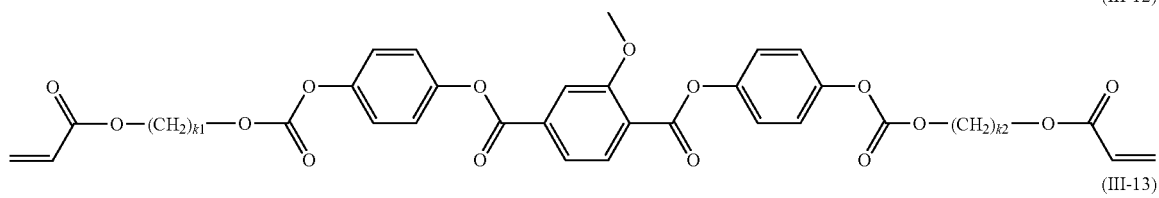

-continued
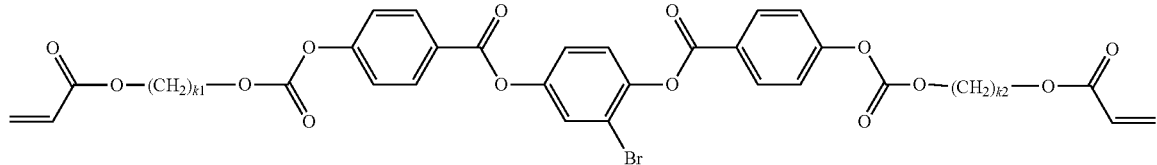
(III-14)
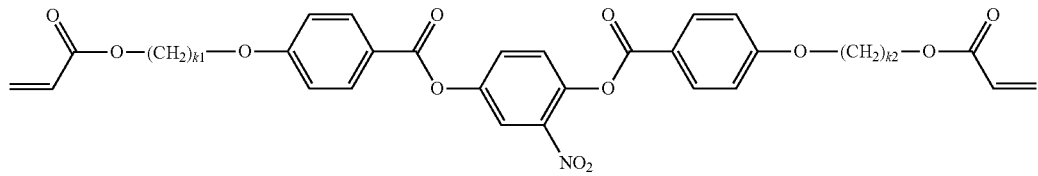
(III-15)
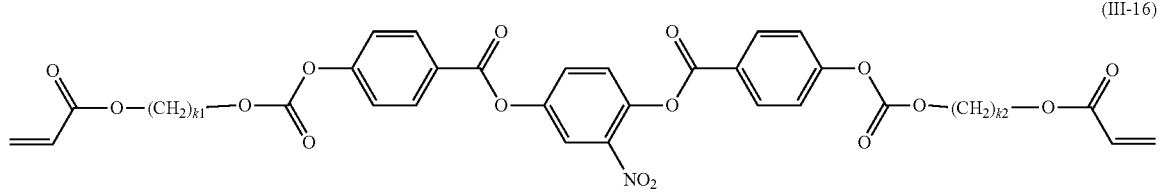
(III-16)
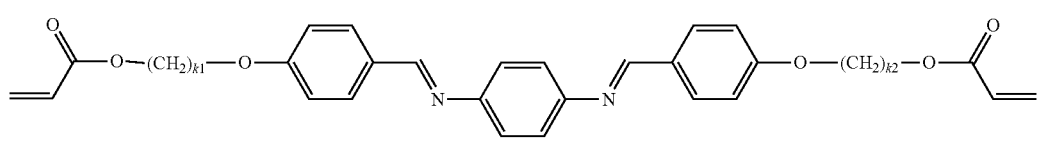
(III-17)
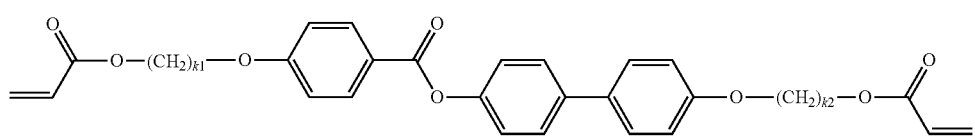
(III-18)
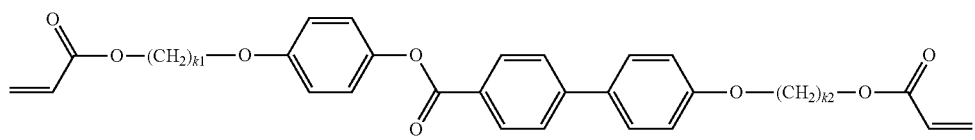
(III-19)
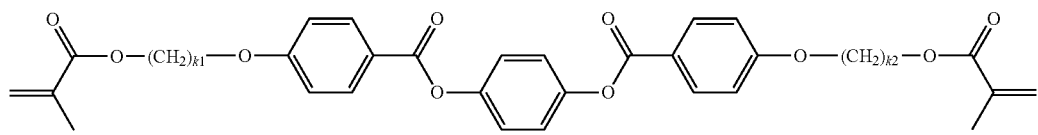
(III-20)
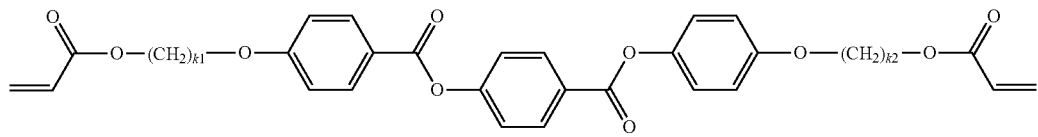
(III-21)
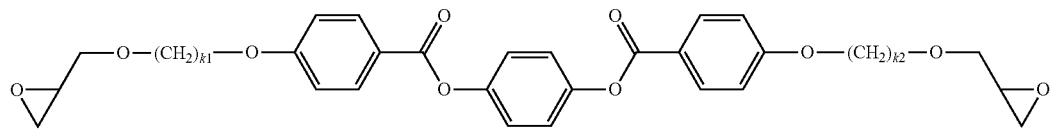
(III-22)
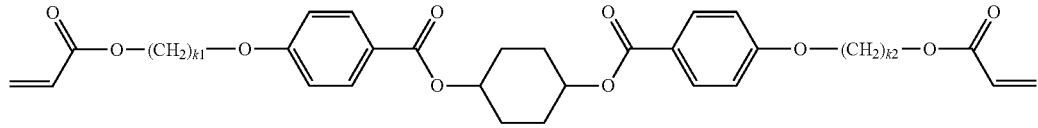
(III-23)

-continued
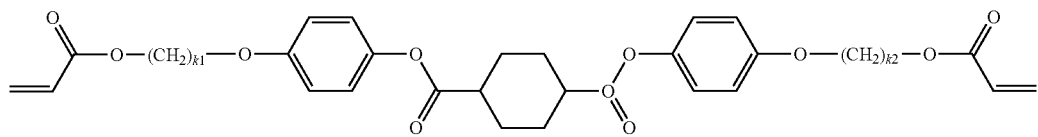 (III-24)
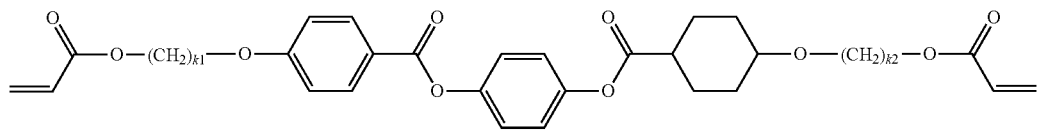 (III-25)
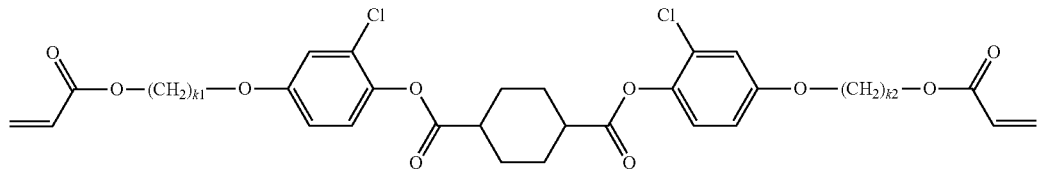 (III-26)
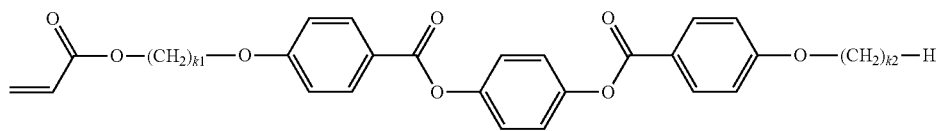 (IV-1)
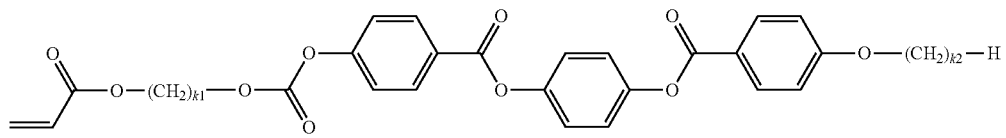 (IV-2)
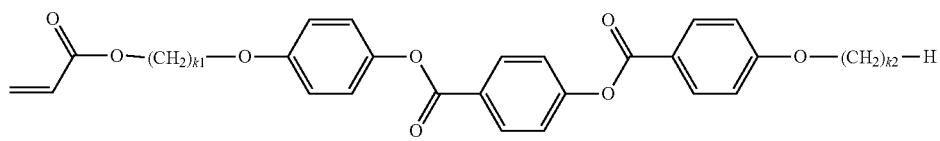 (IV-3)
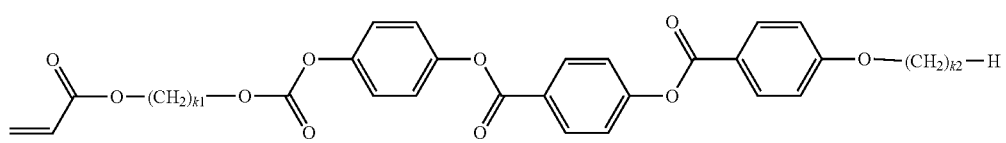 (IV-4)
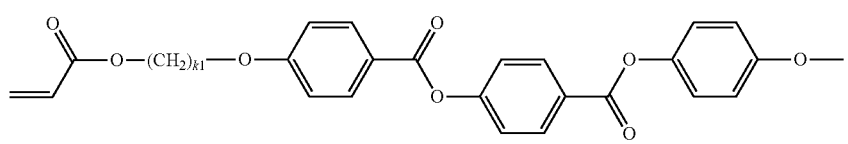 (IV-5)
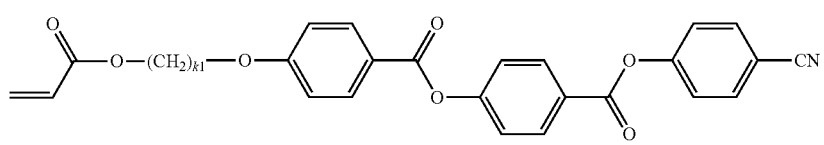 (IV-6)
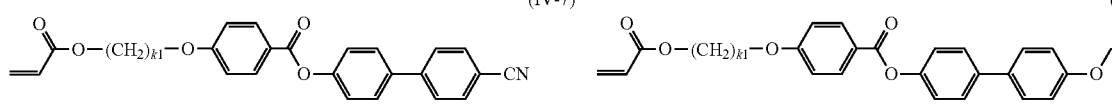
(IV-7)                    (IV-8)
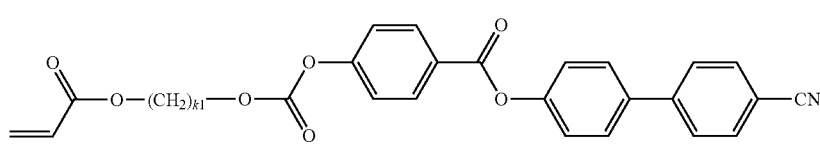 (IV-9)

-continued
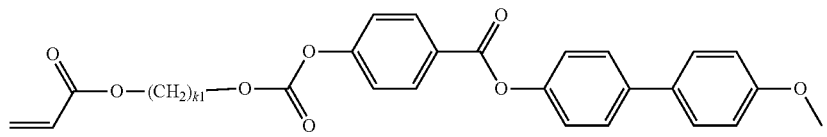
(IV-10)
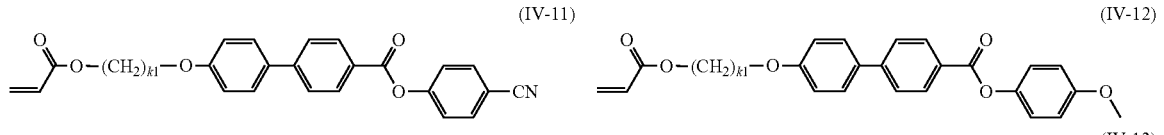
(IV-11) (IV-12)
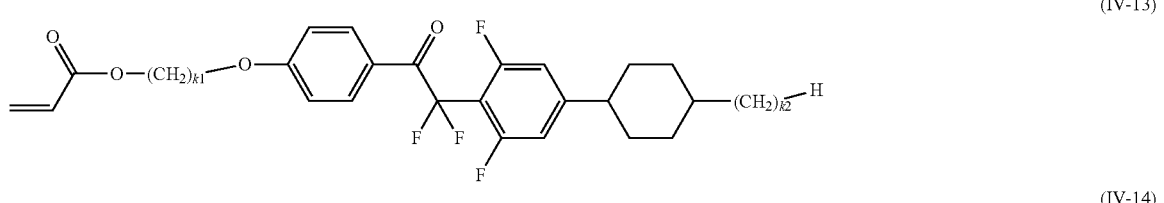
(IV-13)
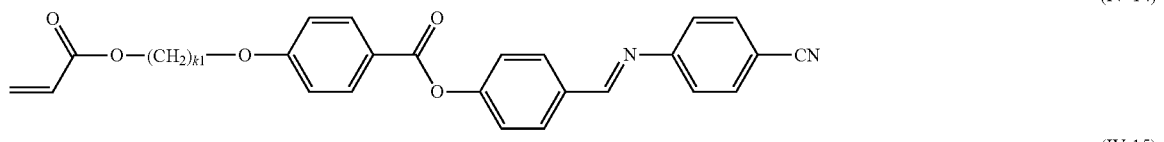
(IV-14)
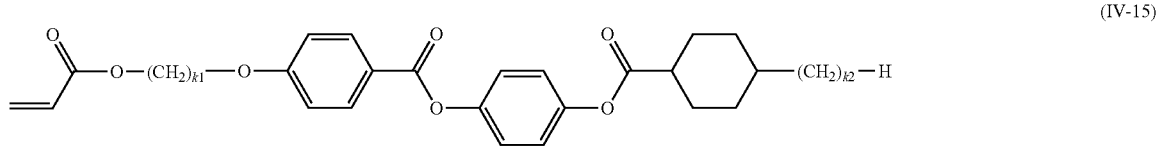
(IV-15)
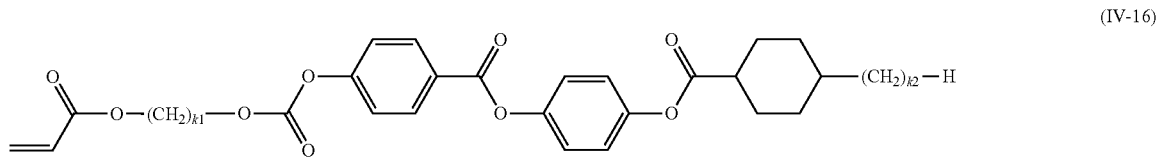
(IV-16)
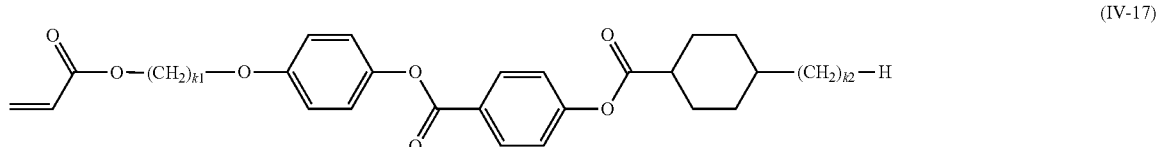
(IV-17)
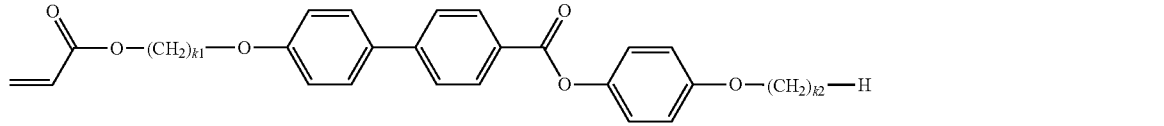
(IV-18)
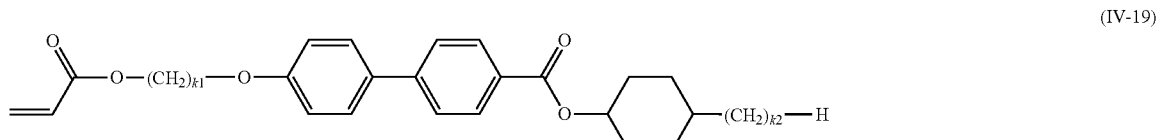
(IV-19)
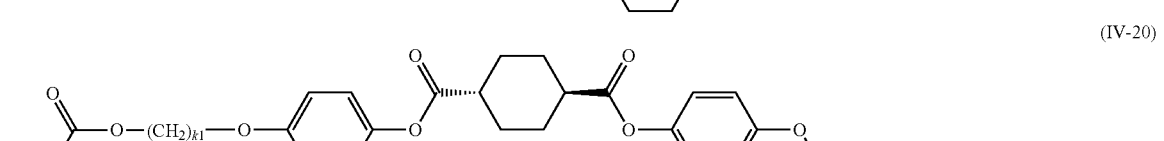
(IV-20)
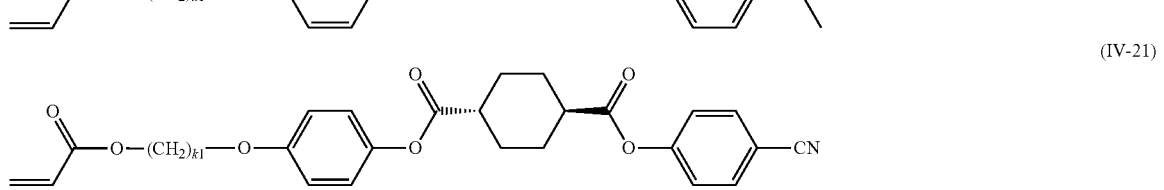
(IV-21)

-continued
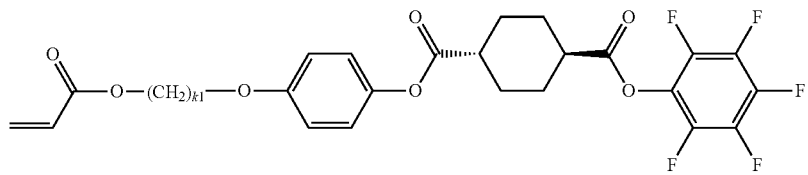
(IV-22)
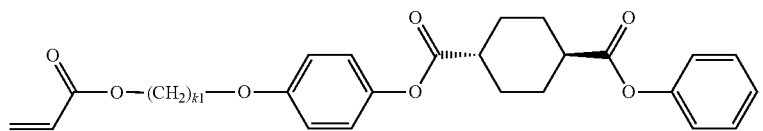
(IV-23)
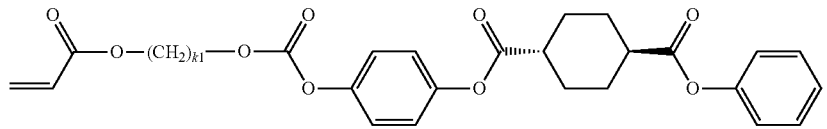
(IV-24)
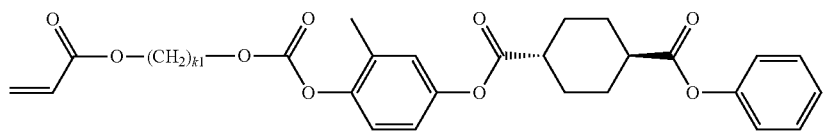
(IV-25)
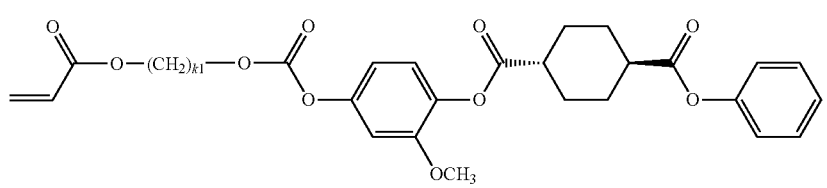
(IV-26)
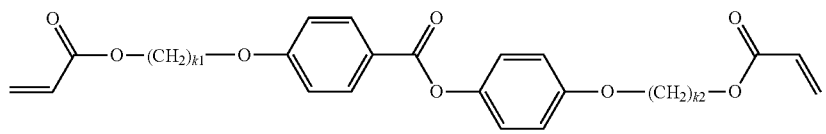
(V-1)
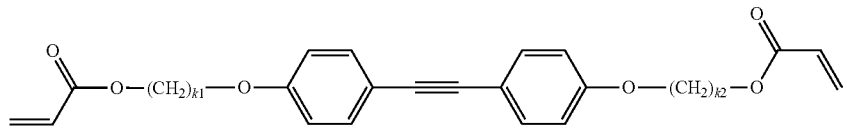
(V-2)
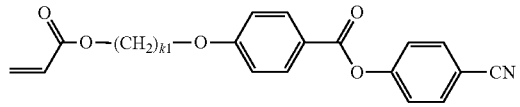
(VI-1)
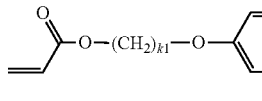
(VI-2)
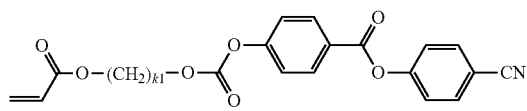
(VI-3)
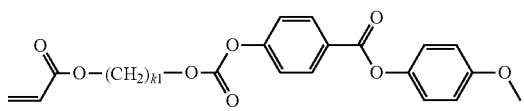
(VI-4)
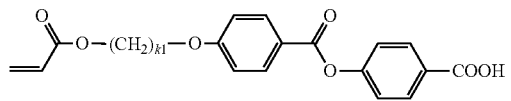
(VI-5)
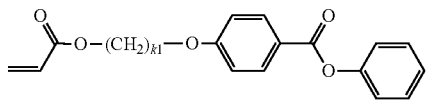
(VI-6)

The content of the liquid crystal material in the composition for forming an optically anisotropic layer is generally from 5 to 50 parts by mass, and preferably from 10 to 30 parts by mass, relative to 100 parts by mass of the composition for forming an optically anisotropic layer.

<Solvent>

As a solvent, preferable is an organic solvent which can dissolve the components of the composition for forming an optically anisotropic layer such as the liquid crystal material, and when the liquid crystal material has a polymerizable group, more preferable is a solvent which can dissolve the components of the composition for forming an optically anisotropic layer such as the liquid crystal material and which is inert to a polymerization reaction of the liquid crystal material.

Specific examples thereof include alcohol solvents such as methanol, ethanol, ethylene glycol, isopropyl alcohol, propylene glycol, methyl cellosolve, butyl cellosolve, propylene glycol monomethyl ether and phenol; ester solvents such as ethyl acetate, butyl acetate, ethylene glycol methyl ether acetate, γ-butyrolactone, propylene glycol methyl ether acetate, ethyl lactate, butyl propionate, 2-methoxyethyl acetate, 2-ethoxyethyl acetate, isoamyl acetate, ethyl acetoacetate and ethyl 3-ethoxypropionate; ketone solvents such as acetone, methyl ethyl ketone, cyclopentanone, cyclohexanone, methyl amyl ketone, methyl isobutyl ketone and N-methyl-2-pyrrolidinone; non-chlorinated aliphatic hydrocarbon solvents such as pentane, hexane and heptane; non-chlorinated aromatic hydrocarbon solvents such as toluene and xylene; nitrile solvents such as acetonitrile; ether solvents such as tetrahydrofuran and dimethoxyethane; and chlorinated hydrocarbon solvents such as chloroform and chlorobenzene. It is also possible to combine two or more of the solvents.

Preferable are alcohol solvents, ester solvents, ketone solvents, non-chlorinated aliphatic hydrocarbon solvents and non-chlorinated aromatic hydrocarbon solvents.

The content of the solvent is preferably from 10 to 10000 parts by mass, and more preferably from 100 to 5000 parts by mass, relative to 100 parts by mass of a solid content. The concentration of the solid content in the composition for forming an optically anisotropic layer is generally from 1 to 90% by mass, preferably from 2 to 50% by mass, and more preferably from 5 to 50% by mass. The "solid content" refers to the total of the components obtained by removing the solvent from the composition for forming an optically anisotropic layer.

<Leveling Agent>

Examples of the leveling agent include organically modified silicone oil-based leveling agents, polyacrylate-based leveling agents and perfluoroalkyl-based leveling agents. Specific examples thereof include DC3PA, SH7PA, DC11PA, SH28PA, SH29PA, SH30PA, ST80PA, ST86PA, SH8400, SH8700 and FZ2123 (manufactured by Dow Corning Toray Co., Ltd.); KP321, KP323, KP324, KP326, KP340, KP341, X22-161A and KF6001 (manufactured by Shin-Etsu Chemical Co., Ltd.); TSF400, TSF401, TSF410, TSF4300, TSF4440, TSF4445, TSF-4446, TSF4452 and TSF4460 (manufactured by Momentive Performance Materials Japan LLC); Fluorinert® FC-72, FC-40 and FC-3283 (manufactured by Sumitomo 3M Limited); Megafac® R-08, R-30, R-90, F-410, F-411, F-443, F-445, F-470, F-477, F-479, F-482 and F-483 (manufactured by DIC Corporation); F Top (product name) EF301, EF303, EF351 and EF352 (manufactured by Mitsubishi Materials Electronic Chemicals Co., Ltd.); Surflon® S-381, S-382, S-383, S-393, SC-101, SC-105, KH-40 and SA-100 (manufactured by AGC SEIMI CHEMICAL CO., LTD); product names E1830 and E5844 (manufactured by Daikin Fine Chemical Laboratory, Co., Ltd.); and BM-1000, BM-1100, BYK-352, BYK-353 and BYK-361N (product names, manufactured by BM Chemie). It is also possible to combine two or more kinds of the leveling agents.

By using the leveling agent, it is possible to form a smoother optically anisotropic layer. It is possible to control a flowability of the composition for forming an optically anisotropic layer and to adjust a crosslinking density of the polymerizable liquid crystal compound, by using the leveling agent. The content of the leveling agent is generally from 0.1 to 30 parts by mass, and preferably from 0.1 to 10 parts by mass, relative to 100 parts by mass of the liquid crystal material.

<Chiral Agent>

Examples of the chiral agent include known chiral agents (for example, described in "Liquid crystal handbook", Chapter 3, Section 4-3, Chiral agent for TN and STN, page 199, edit: Japan Society for the Promotion of Science, 142 committee, 1989).

Although a chiral agent generally comprises an asymmetric carbon atom, it is also possible to use an axially asymmetric compound or a planarly asymmetric compound, which have no asymmetric carbon atom, as the chiral agent. Examples of the axially asymmetric compound and the planarly asymmetric compound include binaphthyl, helicene, paracyclophane and the derivatives thereof.

Specific examples of the chiral agent include compounds described in JP 2007-269640 A, JP 2007-269639 A, JP 2007-176870 A, JP 2003-137887 A, JP 2000-515496 A, JP 2007-169178 A and JP 09-506088 A, and the chiral agent is preferably Paliocolor® LC756 manufactured by BASF Japan.

The content of the chiral agent is generally from 0.1 to 30 parts by mass, and preferably from 1.0 to 25 parts by mass, relative to 100 parts by mass of the liquid crystal material.

<Polymerization Initiator>

The polymerization initiator is preferably a photopolymerization initiator and preferably a photopolymerization initiator which generates a radical due to light radiation.

Examples of the photopolymerization initiator include a benzoin compound, a benzophenone compound, a benzyl ketal compound, an α-hydroxyketone compound, an α-aminoketone compound, an α-acetophenone compound, a triazine compound, an iodonium salt and a sulfonium salt. Specific examples thereof include Irgacure® 907, Irgacure® 184, Irgacure® 651, Irgacure® 819, Irgacure® 250, Irgacure® 369 (manufactured by Ciba Japan K.K.); SEIKUOL® BZ, SEIKUOL® Z, SEIKUOL® BEE (manufactured by Seiko Chemical Co., Ltd); Kayacure® BP100 (manufactured by Nippon Kayaku Co., Ltd.); Kayacure UVI-6992 (manufactured by Dow); Adekaoptomer® SP-152, Adekaoptomer® SP-170 (manufactured by ADEKA Corporation); TAZ-A, TAZ-PP (manufactured by Nihon Siber Hegner); and TAZ-104 (manufactured by SANWA Chemical). Among them, an α-acetophenone compound is preferable. Examples of the α-acetophenone compound include 2-methyl-2-morpholino-1-(4-methylsulfanilphenyl)propan-1-on, 2-dimethylamino-1-(4-morpholinophenyl)-2-benzylbutan-1-on and 2-dimethylamino-1-(4-morpholinophenyl)-2-(4-methylphenylmethyl)butan-1-on. The α-acetophenone compound is more preferably 2-methyl-2-morpholino-1-(4-methylsulfanilphenyl)propan-1-on or 2-dimethylamino-1-(4-morpholinophenyl)-2-benzylbutan-1-on. Examples of a commercially available product of the α-acetophenone compound include Irgacure® 369, 379EG and 907 (manufactured by BASF Japan), and also SEIKUOL® BEE (manufactured by Seiko Chemical Co., Ltd).

The content of the polymerization initiator is generally from 0.1 to 30 parts by mass, and preferably from 0.5 to 10 parts by mass, relative to 100 parts by mass of the liquid crystal material. When the content of the polymerization initiator is in the above range, a liquid crystal orientation of the liquid crystal material is difficult to disturb.

<Polymerization Inhibitor>

Examples of the polymerization inhibitor include hydroquinone and hydroquinones having a substituent group such as alkyl ether group; catechols having an alkyl ether such as butyl catechol; a radical scavenger such as phyrogallols, 2,2,6,6-tetramethyl-1-piperidinyloxy radical; thiophenols; β-naphthylamines and β-naphthols.

The content of the polymerization inhibitor is generally from 0.1 to 30 parts by mass, and preferably from 0.5 to 10 parts by mass, relative to 100 parts by mass of the liquid crystal material. When the content of the polymerization initiator is in the above range, a liquid crystal orientation of the liquid crystal material is difficult to disturb.

<Photosensitizer>

Examples of the photosensitizer include xanthones such as xanthone and thioxanthone; anthracene and anthracenes having a substituent group such as alkyl ether group; phenothiazine; and rubrene.

The content of the photosensitizer is generally from 0.1 to 30 parts by mass, and preferably from 0.5 to 10 parts by mass, relative to 100 parts by mass of the liquid crystal material.

<Reactive Additive>

The reactive additive preferably has a carbon-carbon unsaturated bond and an active hydrogen reactive group in the molecule. The "active hydrogen reactive group" refers to a group reactive to a group having an active hydrogen such as a carboxyl group (—COOH), a hydroxyl group (—OH), an amino group (—NH$_2$), and typical examples thereof include an epoxy group, an oxazoline group, a carbodiimide group, an aziridine group, an imide group, an isocyanate group, a thioisocyanate group and a maleic anhydride group.

In the reactive additive, at least two active hydrogen reactive groups preferably exist, and in this case, the multiple active hydrogen reactive groups may be also identical to or independently different from one another.

The carbon-carbon unsaturated bond contained in the reactive additive may be also a carbon-carbon double bond, a carbon-carbon triple bond or the combination thereof, and is preferably a carbon-carbon double bond. Among them, the reactive additive preferably comprises a vinyl group and/or a (meth)acryl group. Furthermore, the active hydrogen reactive group is preferably selected from at least one of the group consisting of an epoxy group, a glycidy group and an isocyanate group, and is particularly preferably a reactive additive having an acryl group and an isocyanate group.

Specific examples of the reactive additive include a compound having a (meth)acryl group and an epoxy group, such as methacryloxy glycidy ether and acryloxy glycidy ether; a compound having a (meth)acryl group and an oxetane group, such as oxetane acrylate and oxetane methacrylate; a compound having a (meth)acryl group and a lactone group, such as lactone acrylate and lactone methacrylate; a compound having a vinyl group and an oxazoline group, such as vinyl oxazoline and isopropenyl oxazoline; an oligomer of compound having a (meth)acryl group and an isocyanate group such as isocyanatomethyl acrylate, isocyanatomethyl methacrylate, 2-isocyanatoethyl acrylate and 2-isocyanatoethyl methacrylate. In addition, examples thereof include a compound having a vinyl group or a vinylene group and an anhydride, such as methacrylic anhydride, acrylic anhydride, maleic anhydride and vinyl maleic anhydride. Among them, preferable are methacryloxy glycidy ether, acryloxy glycidy ether, isocyanatomethyl acrylate, isocyanatomethyl methacrylate, vinyl oxazoline, 2-isocyanatoethyl acrylate, 2-isocyanatoethyl methacrylate, and the above-mentioned oligomers, and particularly preferable are isocyanatomethyl acrylate, 2-isocyanatoethyl acrylate and the above-mentioned oligomer.

Preferable reactive additive is represented by the following formula (Y):

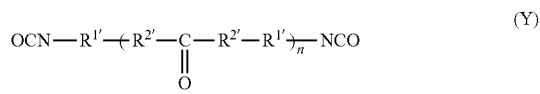

wherein n represents an integer from 1 to 10,

R$^{1'}$ represents a divalent aliphatic or alicyclic hydrocarbon group having 2 to 20 carbon atoms, or a divalent aromatic hydrocarbon group having 5 to 20 carbon atoms, in two R$^{2'}$ contained in each repeating unit, one represents —NH—, and the other represents a group represented by >N—C(═O)—R$^{3'}$, where R$^{3'}$ represents a hydroxyl group or a group having a carbon-carbon unsaturated bond, and in case that n is 2 or more, at least one of R$^{3'}$ in multiple groups >N—C(═O)—R$^3$ is a group having a carbon-carbon unsaturated bond.

Among the reactive additives represented by the formula (Y), particularly preferable is a compound represented by the following formula (YY) (hereinafter, also referred to as "compound (YY)"):

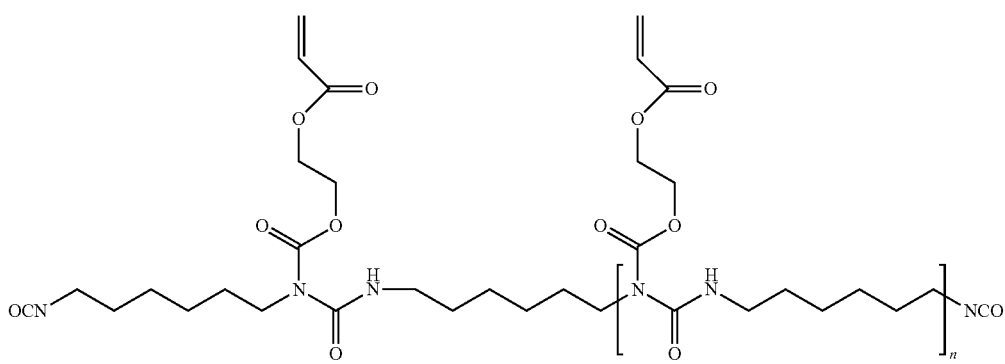

wherein n is as defined above.

As compound (YY), a commercially available product can be used directly or optionally after purified. Examples of the commercially available product include Laromer® LR-9000 (manufactured by BASF).

The content of the reactive additive is generally from 0.1 to 30 parts by mass, and preferably from 0.1 to 5 parts by mass, relative to 100 parts by mass of the liquid crystal material.

An orientation condition of the liquid crystal material is preferably vertical orientation. The expression "vertical" represent an orientation direction of a liquid crystal material in a long side direction relative to a substrate surface. The "vertical orientation" refers to an orientation in which a long side direction of a liquid crystal material is arranged in a vertical direction relative to a surface of a substrate. The "vertical" means 90°±20°.

When a liquid crystal material contained in an optically anisotropic layer exhibits a liquid crystal phase such as a nematic phase, the optically anisotropic layer has birefringence due to monodomain orientation.

<Application>

Examples of a method for applying the composition for forming an optically anisotropic layer to a substrate or a polymer resin layer formed on a substrate include extrusion coating method, direct gravure coating method, reverse gravure coating method, CAP coating method, ink-jet method, dip coating method, slit coating method, die coating method. Examples thereof also include an application method by using a coater such as a dip coater, a bar coater or a spin coater. Among them, in view that continuous application can be carried out in a Roll-to-Roll type, preferable are CAP coating method, ink-jet method, dip coating method, slit coating method, die coating method and an application method with a bar coater. When an application is carried out in a Roll-to-Roll type, it is also possible to form a polymer resin layer on a substrate and further form a photo-orientation layer on the obtained polymer resin layer continuously.

When the composition for forming an optically anisotropic layer comprises a solvent, drying is subsequently carried out to remove the solvent. Examples of a drying method include air drying, draught drying, heat drying, vacuum drying and the combination method thereof. Among them, air drying and heat drying are preferable. The drying temperature is preferably from 0 to 250° C., more preferably from 50 to 220° C., and further preferably from 60 to 170° C. The drying time is preferably from 10 seconds to 60 minutes, and more preferably from 30 seconds to 30 minutes.

The liquid crystal material contained in the applied composition for forming an optically anisotropic layer is generally oriented by drying the composition for forming an optically anisotropic layer and removing a solvent to change the liquid crystal material into a liquid crystal phase.

The oriented liquid crystal material may be also used directly as an optically anisotropic layer. However, when the liquid crystal material has a polymerizable group as in the case of a polymerizable liquid crystal material, it is preferable to polymerize and cure the liquid crystal material. An optically anisotropic layer obtained by polymerization of the liquid crystal material is insulated from the influence of the change of the birefringence due to heat, since the orientation of the liquid crystal material is fixed.

A method for polymerizing the liquid crystal material having a polymerizable group is preferably a photopolymerization method. Since it is possible to carry out a polymerization at a low temperature according to the photopolymerization method, the range of choice for a resin long film substrate to be used is expanded in terms of heat resistance. A photopolymerization reaction is generally carried out by radiating a visible light, an ultraviolet light or a laser light, preferably an ultraviolet light.

When the applied composition for forming an optically anisotropic layer comprises a solvent, light radiation is preferably carried out after the solvent is removed and dried. Drying may be carried out together with light radiation. It is preferable to remove most of the solvent before light radiation is carried out.

The time to radiate light is generally from 5 seconds to 10 minutes, preferably from 5 seconds to 2 minutes, more preferably from 5 seconds to 1 minute, and further preferably from 5 seconds to 30 seconds. When the time to radiate light is in the above range, an optically anisotropic layer having superior transparency can be obtained.

The process for producing an optically anisotropic layer can be applied to a continuous step such as Roll-to-Roll, and it is easy to combine another component according to the production process, and thus, the production process is superior in productivity. In addition, since the optically anisotropic layer in the optically anisotropic film obtained thus is thin, the optically anisotropic film is particularly suitable for a medium or small type display device.

The present optically anisotropic film is useful as a component constituting a polarization plate. The polarization plate has the present optically anisotropic layer and a polarization element. nx direction of the substrate of the present optically anisotropic film contained in the polarization plate is preferably perpendicular to a transmission axis direction of a polarizer.

Figure 1B:
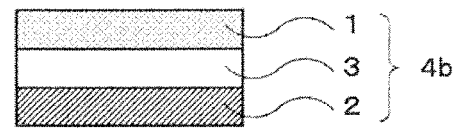

Specific examples of the polarization plate comprising the present optically anisotropic film and a polarization element (hereinafter, also referred to as "present polarization plate") include constitutions shown in FIG. 1A and FIG. 1B. The present polarization plate 4a shown in FIG. 1A is a polarization plate in which the present optically anisotropic film 1 and polarization element 2 are directly laminated, and the present polarization plate 4b shown in FIG. 1B is a polarization plate in which the present optically anisotropic film 1 and polarization element 2 are stuck via adhesion layer 3. The "adhesion" in adhesion layer 3 refers to an adhesive agent and/or a collective term of adhesion with an adhesive agent.

Figure 2A:
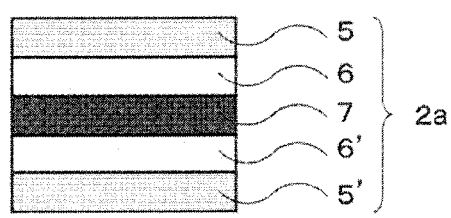
FIG. 2A and FIG. 2E are diagrams showing an example of a polarization element according to the present invention.
Figure 2B:
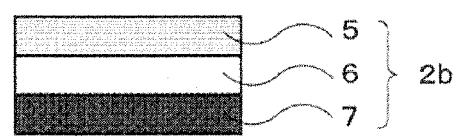

Specific examples of polarization element 2 include constitutions shown in FIG. 2A and FIG. 2B. Polarization element 2a shown in FIG. 2A is a polarization plate in which protective film 5, adhesive agent layer 6, polarizer 7, adhesive agent layer 6' and protective film 5' are laminated in order, and polarization element 2b shown in FIG. 2B is a polarization plate in which protective film 5, adhesive agent layer 6 and polarizer 7 are laminated in order.

Polarizer 7 should have a polarizing function. Examples of polarizer 7 include a stretched film which has absorbed a pigment having absorption anisotropy; and a film on which a pigment having absorption anisotropy is applied. Examples of a pigment having absorption anisotropy include a dichroism pigment such as iodine and an azo compound.

Examples of the stretched film which has absorbed a pigment having absorption anisotropy include a film obtained by stretching a polyvinyl alcohol-based film which has absorbed a dichroism pigment; and a film obtained by stretching a polyvinyl alcohol-based film and then absorbing a dichroism pigment.

Examples of the film on which a pigment having absorption anisotropy is applied include a film obtained by applying a composition comprising a dichroism pigment having liquid crystallinity or a composition comprising a dichroism pigment and a polymerizable liquid crystal compound.

Specific examples of the stretched film which has absorbed a pigment having absorption anisotropy include polarization plates described in JP 3708062 B, JP 4432487 B and the like.

Specific examples of the film on which a pigment having absorption anisotropy is applied include orientation films described in JP 2012-33249 A and the like.

Examples of protective films 5 and 5' include a film of a polyolefin such as polyethylene, polypropylene, norbornene-based polymers; a polyethylene terephthalate film; a polymethacrylic acid ester film; a polyacrylic acid ester film; a cellulosic ester film; a polyethylene naphthalate film; a polycarbonate film; a polysulfone film; a polyethersulfone film; a polyetherketone film; a. polyphenylene sulfide film; and a polyphenylene oxide film.

An adhesive agent, which forms adhesive agent layer 6 and adhesive agent layer 6', is preferably an adhesive agent having high transparency and superior heat resistance. Examples of such an adhesive agent include an acryl-based adhesive agent, an epoxy-based adhesive agent and an urethane-based adhesive agent.

Figure 3A:
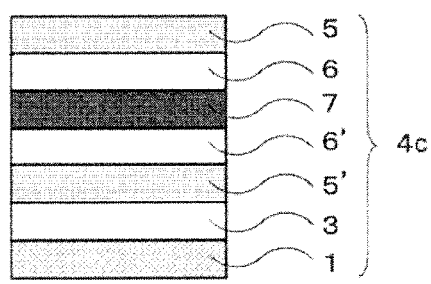
FIG. 3A to FIG. 3C are diagrams showing an example of a polarization plate according to the present invention.
Figure 3B:
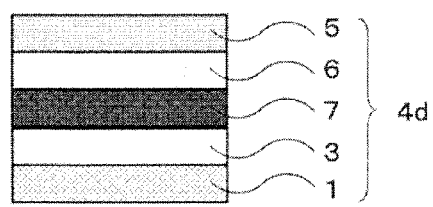
Figure 3C:
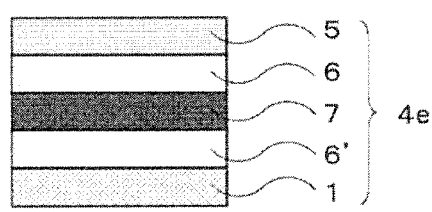

Examples of the present polarization plate comprising the polarization element 2 include polarization plates shown in FIG. 3A to FIG. 3C. Polarization plate 4c shown in FIG. 3A is a polarization plate in which protective film 5, adhesive agent layer 6, polarizer 7, adhesive agent layer 6', protective film 5', adhesion layer 3 and the present optically anisotropic film 1 are laminated in order, and polarization plate 4d shown in FIG. 3B is a polarization plate in which protective film 5, adhesive agent layer 6, polarizer 7, adhesion layer 3 and the present optically anisotropic film 1 are laminated in order. The present polarization plate may be a constitution of polarization plate 4c or polarization plate 4d. As in the case of polarization plate 4e shown in FIG. 3C, the present polarization plate is preferably a polarization plate in which protective film 5, adhesive agent layer 6, polarizer 7, adhesive agent layer 6' and the present optically anisotropic film 1 are laminated in order, since optically anisotropic film 1 and polarizer 7 strongly adhere with adhesive agent layer 6' and the laminated product has an increased durability.

The polarization degree of a polarization plate comprising the present optically anisotropic film is generally 99.9% or higher and preferably 99.97% or higher.

Figure 4A:
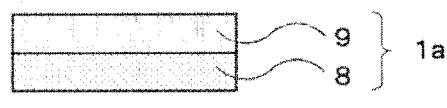
FIGS. 4A and 4B are diagrams showing an example of a lamination embodiment of an optically anisotropic film according to the present invention.
Figure 4B:
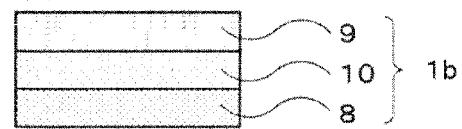

A lamination embodiment of the present optically anisotropic film 1 will be described below. Specific examples of the constitutions of the present optically anisotropic film 1 include constitutions shown in FIG. 4A and FIG. 4B. The present optically anisotropic film 1a shown in FIG. 4A has a constitution in which substrate 8 and the present optically anisotropic layer 9 are directly laminated, and the present optically anisotropic film 1b shown in FIG. 4B has a constitution in which substrate 8, polymer resin layer 10 and the present optically anisotropic layer 9 are laminated in order.

Figure 5A:
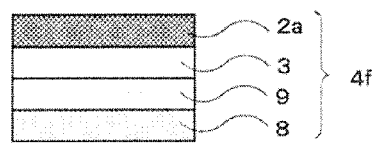
FIG. 5A to FIG. 5J are diagrams showing an example of a polarization plate according to the present invention.
Figure 5B:
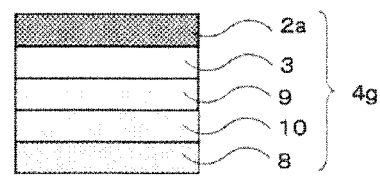
Figure 5C:
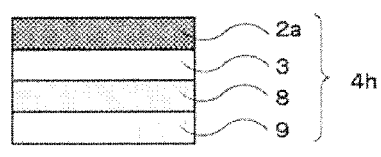
Figure 5D:
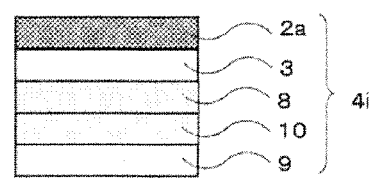
Figure 5E:
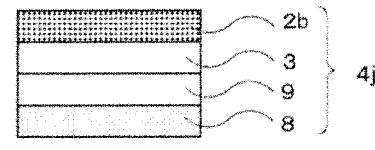
Figure 5F:
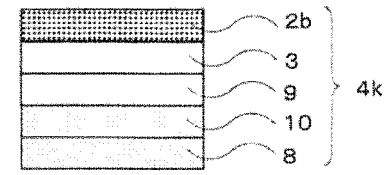
Figure 5G:
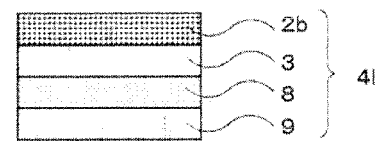
Figure 5H:
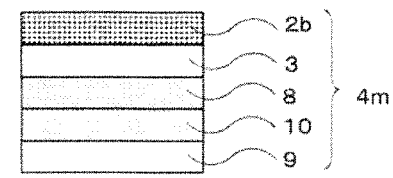

In addition to the details of the present optically anisotropic film 1, the constitution of the present polarization plate will be described in more detail. Specific examples thereof include polarization plates shown in FIG. 5A to FIG. 5D. Polarization plate 4f shown in FIG. 5A has a constitution in which polarization element 2a, adhesion layer 3, the present optically anisotropic layer 9 and substrate 8 are laminated in order, and polarization plate 4g shown in FIG. 5B has a constitution in which polarization element 2a, adhesion layer 3, the present optically anisotropic layer 9, polymer resin layer 10 and substrate 8 are laminated in order. Polarization plate 4h shown in FIG. 5C has a constitution in which polarization element 2a, adhesion layer 3, substrate 8 and the present optically anisotropic layer 9 are laminated in order, and polarization plate 4i shown in FIG. 5D has a constitution in which polarization element 2a, adhesion layer 3, substrate 8, polymer resin layer 10 and the present optically anisotropic layer 9 are laminated in order.

In addition, specific examples of the present polarization plate include polarization plates shown in FIG. 5E to FIG. 5H. Polarization plate 4j shown in FIG. 5E has a constitution in which polarization element 2b, adhesion layer 3, the present optically anisotropic layer 9 and substrate 8 are laminated in order, and polarization plate 4k shown in FIG. 5F has a constitution in which polarization element 2b, adhesion layer 3, the present optically anisotropic layer 9, polymer resin layer 10 and substrate 8 are laminated in order. Polarization plate 4l shown in FIG. 5G has a constitution in which polarization element 2b, adhesion layer 3, substrate 8 and the present optically anisotropic layer 9 are laminated in order, and polarization plate 4m shown in FIG. 5H has a constitution in which polarization element 2b, adhesion layer 3, substrate 8, polymer resin layer 10 and the present optically anisotropic layer 9 are laminated in order. Here, polarizer 7 contained in polarization element 2b is contacted with adhesion layer 3.

Figure 5I:
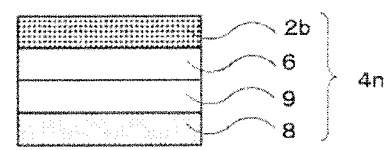
Figure 5J:
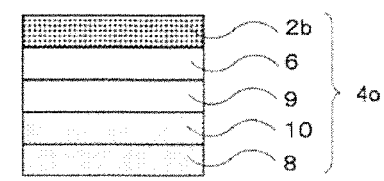

As to the constitution of the present polarization plate, examples of the preferable constitution include a constitution in which polarization element 2b, adhesive agent layer 6, the present optically anisotropic layer 9 and substrate 8 are laminated in order as in the case of polarization plate 4n shown in FIG. 5I, and a constitution in which polarization element 2b, adhesive agent layer 6, the present optically anisotropic layer 9, polymer resin layer 10 and substrate 8 are laminated in order as in the case of polarization plate 4o shown in FIG. 5J. Here, polarizer 7 contained in polarization element 2b is contacted with adhesive agent layer 6. It is preferable that the polarization plate comprising the optically anisotropic layer has an increased durability by binding polarization element 2b and the present optically anisotropic layer 9 via adhesive agent layer 6.

The present polarization plate can be used for a display device. Examples of the display device include a liquid crystal display device comprising a liquid crystal panel in which the present polarization plate is stuck to the liquid crystal panel. As to an embodiment of a display device comprising the present polarization plate, a constitution of the liquid crystal display device will be described.

The display device comprising the present polarization plate will be described with FIG. 6A to FIG. 6C. As a preferable constitution, adhesion layer 3 is laminated on the substrate 8 side of the present polarization plate 4n (polarization element 2b, adhesive agent layer 6, the present optically anisotropic layer 9 and substrate 8) as shown in the constitution in FIG. 5I, and subsequently protective layer 12a is stuck thereon, as shown in FIG. 6A. In addition, polarization element 2a is stuck with adhesive agent 3' on the other side, which the present polarization plate 4n has not been stuck, of the protective layer 12b of the liquid crystal cell. Here, transmission axis 13b of polarization element 2a is perpendicular to transmission axis 13a of polarization element 2b. In these liquid crystal devices, black display can be achieved by applying a voltage to the liquid crystal panel with electrodes unshown in the figure to change an orientation of a liquid crystal molecule.

Other examples of the display device comprising the present polarization plate include a constitution in FIG. 6B. The display device shown in FIG. 6B comprises polymer resin layer 10 between substrate 8 and the present optically anisotropic layer 9.

In FIG. 6C, the directions of nx, ny and nz in FIG. 6A and FIG. 6B are shown.

A number of the present optically anisotropic films may be also laminated, and the present optically anisotropic film may be combined with another film. When a number of the present optically anisotropic film are laminated or when the present optically anisotropic film may be combined with another film, it is possible to use it as a viewing angle compensation film, a viewing angle expansion film, an antireflection film, a polarization plate, a circular polarization plate, an elliptical polarization plate or a luminance-improving film.

The optical properties of the present optically anisotropic film can be changed depending on an orientation condition of a liquid crystal material, and the present optically anisotropic film can be used as a compensation film for a liquid crystal display device of VA (vertical alignment) mode, IPS (in-plane switching) mode, OCB (optically compensated bend) mode, TN (twisted nematic) mode, STN (super twisted nematic) mode or the like. Among them, the present optically anisotropic film is suitable for a compensation film for a liquid crystal display device of VA mode or IPS mode, and used as a compensation film for a liquid crystal display device of IPS mode.

EXAMPLES

Hereinafter, the present invention will be described in more detail by examples. "%" and "part(s)" in the examples refer to % by mass and part(s) by mass, unless otherwise described.
(Preparation of Anisotropic Polymer Composition)

A formulation of an anisotropic polymer composition (A) is shown in Table 1. N-methyl-2-pyrolidone, 2-butoxyethanol and ethylcyclohexane were added to a commercially available product of an anisotropic polymer, SUNEVER SE-610 (manufactured by NISSAN CHEMICAL INDUSTRIES, LTD.) to prepare anisotropic polymer composition (A).

TABLE 1

|  | SE-610 Solid content | N-methyl-2-pyrolidone | 2-butoxy-ethanol | Ethyl-cyclohexane |
| --- | --- | --- | --- | --- |
| Anisotropic polymer composition (A) | 0.26 g (0.5%) | 36.8 g (72.3%) | 9.2 g (18.1%) | 4.6 g (9.1%) |

The values in Table 1 represent content ratios of each component relative to the total of the prepared composition. As to SE-610, the solid content was converted from the concentration described in the delivered specification.
(Preparation of Composition for Forming Optically Anisotropic Layer)

A formulation of composition for forming an optically anisotropic layer (1) is shown in Table 2. The components were mixed, and the resulting solution was stirred at 80° C. for one hour and then cooled to room temperature to prepare composition for forming optically anisotropic layer (1).

TABLE 2

|  | Liquid crystal compound | Photo-polymerization initiator | Leveling agent | Reactive additive | Solvent |
| --- | --- | --- | --- | --- | --- |
| Composition for forming optically anisotropic layer (1) | LC242 (19.2%) | Irg907 (0.5%) | BYK-361N (0.1%) | LR-9000 (1.1%) | PGMEA (79.1%) |

The values in the brackets in Table 2 represent content ratios of each component relative to the total of the prepared composition.

In Table 2, LR-9000 represents Laromer® LR-9000 (manufactured by BASF Japan), Irg907 represents Irgacure® 907 (manufactured by BASF Japan), BYK-361N represents a leveling agent manufactured by BYK Japan KK, LC242 represents a liquid crystal compound represented by the following formula manufactured by BASF, and PGMEA represents propylene glycol 1-monomethyl ether 2-acetate.

LC242

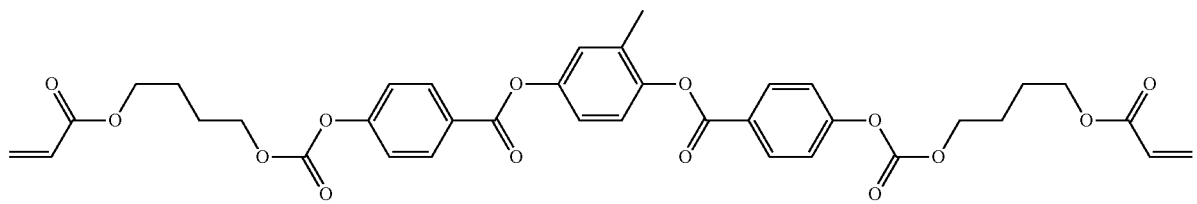

Production Example 1

Production Example of Optically Anisotropic Layer (1) of the Present Invention A surface of a cycloolefin polymer film (COP-A) (ZF-14, manufactured by ZEON Corporation) having a retardation value of nearly 0 at a wavelength of 550 nm was plasma-treated once by means of a corona treatment device in conditions of power of 0.3 kW and treatment speed of 3 m/min. Anisotropic polymer composition (A) was applied to the corona-treated surface by means of a die coater and dried at 90° C. for one minute to form an orientation layer. The layer thickness of the obtained orientation layer was measured as 70 nm by means of a laser microscope (LEXT, manufactured by Olympus Corporation). The retardation value of the obtained orientation layer was measured (measurement device: KOBRA-WR, manufactured by Oji Scientific Instruments), and $R_0(550)=0.7$ nm. Since the retardation value of the COP-A at a wavelength of 550 nm is nearly 0, the retardation value is not affected. Then, composition for forming an optically anisotropic layer (1) was applied to the obtained orientation layer by means of a die coater and dried at 90° C. for one minute, and an ultraviolet ray was applied (under a nitrogen atmosphere, integral of light at a wavelength of 365 nm: 1000 mJ/cm$^2$) by means of a high-pressure mercury lamp (UNICURE VB-15201BY-A, manufactured by USHIO INC.) to form optically anisotropic layer (1). The layer thickness of the obtained optically anisotropic layer (1) was measured as 534 nm by means of a laser microscope. In addition, the retardation value to a wavelength of 550 nm of the obtained optically anisotropic layer (1) was measured while changing an incident angle, and $R_3(550)=1.3$ nm, $R_{40}(550)=21.9$ nm, and $R_{th}(550)=-84$ nm. When an average refractive index n0 of optically anisotropic layer (1) was 1.58 and each refractive indices were determined according to formulae (21) to (23), nx=1.526, ny=1.523 and nz=1.691. That is, optically anisotropic layer (1) has a refractive index relation of nz>nx>ny.

$$R_0=(nx-ny)\times d \quad (21)$$

$$R_{40}=(nx-ny')\times d/\cos(\phi) \quad (22)$$

$$(nx+ny+nz)/3=n0 \quad (23)$$

Example 1

Production Example of Optically Anisotropic Film (1) of the Present Invention Optically anisotropic layer (2) was formed and optically anisotropic film (1) was obtained in the same manner as in Example 1 except in that COP-B (cycloolefin polymer film, $R_0(550)=117.8$ nm, $R_{40}(550)=101.0$ nm, nx=1.583, ny=1.579, nz=1.578) was used instead of COP-A. The layer thickness of the obtained optically anisotropic layer (2) was measured as 597 nm by means of a laser microscope. The retardation value of the obtained optically anisotropic film (1) was measured, and additionally each refractive indices when average refractive index of optically anisotropic film (1) was 1.58 was calculated. The result is shown in Table 3 and Table 4.

Example 2

Production Example of Optically Anisotropic Film (2) of the Present Invention Optically anisotropic layer (3) was formed and optically anisotropic film (2) was obtained in the same manner as in Example 1 except in that COP-C (cycloolefin polymer film, $R_0(550)=116.0$ nm, $R_{40}(550)=99.5$ nm, nx=1.583, ny=1.579, nz=1.578) was used instead of COP-A. The layer thickness of the obtained optically anisotropic layer (3) was measured as 513 nm by means of a laser microscope. The retardation value of the obtained optically anisotropic film (2) was measured, and additionally each refractive indices when average refractive index of optically anisotropic film (2) was 1.58 was calculated. The result is shown in Table 3 and Table 4.

Observation of Black Display

Example 3

An adhesive agent and a polarization element were laminated in order on an optically anisotropic layer surface of optically anisotropic film (1). In this case, the lamination was carried out in such a manner that a transmission axis of the polarization element was nearly perpendicular to a slow axis of the substrate (COP-B) contained in optically anisotropic film (1). The obtained polarization element comprising an optically anisotropic film (polarization plate) was stuck on a visual contact side of i-Pad® (liquid crystal display device of IPS mode, manufactured by Apple, Inc.) in which a visual contact side-polarization plate had been removed, and light leakage in black display was visually observed from a direction of azimuth angle of 45 degrees relative to a transmission axis of the polarizer and of elevation angle of 45 degrees relative to a panel surface. The result is shown in Table 5.

Example 4

Light leakage in black display was observed in the same manner as in Example 3 except in that optically anisotropic film (2) was used instead of optically anisotropic film (1). The result is shown in Table 5.

Reference Example 1

Light leakage in black display was observed in the same manner as in Example 3 except in that COP-D (cycloolefin polymer film, $R_0(450)=139$ nm, $R_0(550)=137.8$ nm, $R_{40}(550)=124.7$ nm, nx=1.5833, ny=1.5784, nz=1.5782) was used instead of optically anisotropic film (1). The result is shown in Table 5.

TABLE 3

|  | $R_0(450)$ (nm) | $R_0(550)$ (nm) | $R_{40}(450)$ (nm) | $R_0(450)/R_0(550)$ |
| --- | --- | --- | --- | --- |
| Example 1 | 118 | 117 | 122 | 1.008 |
| Example 2 | 117 | 116 | 120 | 1.008 |
| Reference example 1 | 139 | 138 | 125 | 1.004 |

TABLE 4

|  | nx | ny | nz | nx − nz | nz − ny |
| --- | --- | --- | --- | --- | --- |
| Example 1 | 1.5818 | 1.5777 | 1.5806 | 0.0012 | 0.0029 |
| Example 2 | 1.5818 | 1.5777 | 1.5804 | 0.0014 | 0.0027 |
| Reference example 1 | 1.5833 | 1.5784 | 1.5782 | 0.0051 | −0.0002 |

TABLE 5

|  | Light leakage in black display (hue) |
| --- | --- |
| Example 3 | Nonexistence (black) |
| Example 4 | Nonexistence (black) |
| Reference example 1 | Existence (blue) |

It has been confirmed that the optically anisotropic films formed in the Examples are superior in light leakage suppression in black display when viewed obliquely.

According to the present invention, it is possible to obtain an optically anisotropic film which is superior in light leakage suppression in black display.

DESCRIPTION OF SYMBOLS

1: Present optically anisotropic film
2a, 2b: Polarization element
3: Adhesion layer
4a, 4b, 4c, 4d, 4e, 4f, 4g, 4h, 4i, 4j, 4k, 4l, 4m, 4n, 4o: Polarization plate
5, 5': Protective film
6, 6': Adhesive agent layer
7: Polarizer
8: Substrate
9: Present optically anisotropic layer
10: Polymer resin layer
11: Liquid crystal cell
12a, 12b: Protective layer of liquid crystal cell
13a, 13b: Transmission axis of polarization element
14: Slow axis of substrate
15: Slow axis of liquid crystal molecule in liquid crystal cell (in black display)

The invention claimed is:

1. An optically anisotropic film which has a refractive index relation of nx>nz>ny, wherein nx−nz is less than 0.005, nz−ny is less than 0.004, and $R_0(450)/R_0(550)$ is from 0.8 to 1.2,
wherein nz represents a refractive index in a thickness direction, nx represents an in-plane refractive index in a direction in which a maximum refractive index is generated in a plane of the film, ny represents a refractive index in a direction perpendicular to a direction of nx in the plane of the film, $R_0(550)$ represents the value of a front retardation of the anisotropic film to a light having a wavelength of 550 nm, and $R_0(450)$ represents the value of a front retardation of the anisotropic film to a light having a wavelength of 450 nm.

2. The optically anisotropic film according to claim 1, wherein $R_0(550)$ is from 90 to 160 nm, $R_{40}(550)$ is from 91 to 170 nm, and $R_{40}(550)-R_0(550)$ is 10 nm or less,
wherein $R_0(550)$ is as defined above, $R_{40}(550)$ represents the value of a retardation to a light having a wavelength of 550 nm entered from a direction tilted at 40 degrees from the thickness direction of the optically anisotropic film when a direction of ny is taken as a tilting axis.

3. The optically anisotropic film according to claim 1, wherein the film is a laminate which comprises an optically anisotropic layer and a substrate, the optically anisotropic layer having an optical axis in the thickness direction of the optically anisotropic layer.

4. The optically anisotropic film according to claim 3, wherein the substrate has an optical axis in an in-plane direction.

5. The optically anisotropic film according to claim 3, wherein a difference between ny and nz of the substrate is from 0 to 0.01, wherein nz of the substrate represents a refractive index of the substrate in a thickness direction, ny of the substrate represents a refractive index of the substrate in a direction perpendicular to a direction of nx of the substrate in a plane of the substrate, and nx of the substrate represents an in-plane refractive index in a direction in which a maximum refractive index is generated in a plane of the substrate.

6. The optically anisotropic film according to claim 3, wherein the film further has a polymer resin layer having a thickness of 1 to 300 nm between the substrate and the optically anisotropic layer.

7. The optically anisotropic film according to claim 6, wherein $R_0(550)$ of the polymer resin layer is from 0 to 10 nm,
wherein $R_0(550)$ represents the value of a front retardation of the polymer resin layer to a light having a wavelength of 550 nm.

8. A polarization plate comprising the optically anisotropic film according to claim 1 and a polarization element.

9. A polarization plate comprising the optically anisotropic film according to claim 3 and a polarization element, wherein the optically anisotropic layer of the optically anisotropic film and the polarization element are laminated via an adhesive agent layer.

10. The polarization plate according to claim 9, wherein the direction of nx of the substrate for the optically anisotropic film is perpendicular to the transmission axis direction of the polarization element,
wherein nx of the substrate represents an in-plane refractive index of the substrate in a direction in which a maximum refractive index is generated in a plane of the substrate.

11. A display device comprising the optically anisotropic film according to claim 1.

12. A display device comprising the polarization plate according to claim 8.

13. A display device comprising the polarization plate according to claim 9.

14. A display device comprising the polarization plate according to claim 10.

15. The optically anisotropic film according to claim 4, wherein the difference between ny and nz of the substrate is from 0 to 0.01,
wherein nz of the substrate represents a refractive index of the substrate in a thickness direction, ny of the substrate represents a refractive index of the substrate in a direction perpendicular to nx of the substrate in a plane of the substrate, and nx of the substrate represents an in-plane refractive index of the substrate in a direction in which a maximum refractive index is generated in the plane of the substrate.

* * * * *